(12) United States Patent
Nakayama et al.

(10) Patent No.: US 9,654,676 B2
(45) Date of Patent: May 16, 2017

(54) OPTICAL ELEMENT, OPTICAL SYSTEM AND IMAGING APPARATUS

(71) Applicant: Asahi Glass Company, Limited, Tokyo (JP)

(72) Inventors: Motoshi Nakayama, Koriyama (JP); Takuji Nomura, Koriyama (JP); Kensuke Ono, Koriyama (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 14/736,415

(22) Filed: Jun. 11, 2015

(65) Prior Publication Data

US 2015/0281536 A1 Oct. 1, 2015

Related U.S. Application Data

(63) Continuation of application No. PCT/JP2013/083637, filed on Dec. 16, 2013.

(30) Foreign Application Priority Data

Dec. 17, 2012 (JP) ................................ 2012-274956

(51) Int. Cl.
*H04N 5/225* (2006.01)
*G02B 1/113* (2015.01)
(Continued)

(52) U.S. Cl.
CPC .......... *H04N 5/2254* (2013.01); *G02B 1/113* (2013.01); *G02B 1/115* (2013.01); *G02B 5/005* (2013.01);
(Continued)

(58) Field of Classification Search
CPC ...... H04N 5/225; H04N 5/2254; G02B 25/00; G02B 9/00; G02B 5/005; B29C 39/006
See application file for complete search history.

(56) References Cited

U.S. PATENT DOCUMENTS

2005/0018302 A1* 1/2005 Yano .................. G02B 5/281
359/588
2005/0041949 A1 2/2005 Onuki et al.
(Continued)

FOREIGN PATENT DOCUMENTS

CN 101075588 A 11/2007
CN 102197320 A 9/2011
(Continued)

OTHER PUBLICATIONS

International Search Report issued Apr. 1, 2014 in PCT/JP2013/083637 filed Dec. 16, 2013.

*Primary Examiner* — Abdelaaziz Tissire
(74) *Attorney, Agent, or Firm* — Oblon, McClelland, Maier & Neustadt, L.L.P.

(57) ABSTRACT

An optical element in which transmittance of light monotonically decreases from a center portion toward a peripheral portion, includes a light absorbing portion, made of a material that absorbs a part of or all of visible light, formed at one surface of a transparent substrate such that its thickness monotonically increases from the center portion toward the peripheral portion; a light transmitting portion, made of a material that transmits visible light, formed on the light absorbing portion; and a transparent resin layer, made of a material that transmits visible light, formed at another surface of the transparent substrate, wherein each of the light absorbing portion, the light transmitting portion and the transparent resin layer is made of a resin material.

21 Claims, 20 Drawing Sheets

(51) Int. Cl.
*G02B 1/115* (2015.01)
*G02B 5/00* (2006.01)
*G02B 5/20* (2006.01)
*G03B 9/02* (2006.01)
*G02B 13/00* (2006.01)
*G02B 1/14* (2015.01)

(52) U.S. Cl.
CPC ............... *G02B 5/205* (2013.01); *G03B 9/02* (2013.01); *G02B 1/14* (2015.01); *G02B 13/004* (2013.01); *H04N 5/2257* (2013.01)

(56) References Cited

U.S. PATENT DOCUMENTS

| 2007/0139792 | A1* | 6/2007 | Sayag | G02B 5/005 |
| | | | | 359/739 |
| 2008/0299303 | A1 | 12/2008 | Kobayashi et al. | |
| 2011/0211261 | A1* | 9/2011 | Fukuta | B29C 39/006 |
| | | | | 359/642 |
| 2011/0242684 | A1 | 10/2011 | Shinohara | |
| 2015/0177533 | A1* | 6/2015 | Ono | G02B 13/004 |
| | | | | 348/342 |
| 2015/0192783 | A1* | 7/2015 | Ishido | G02B 5/005 |
| | | | | 359/359 |

FOREIGN PATENT DOCUMENTS

| JP | 11-231209 | 8/1999 |
| JP | 2008-275772 | 11/2008 |
| JP | 2009-521722 | 6/2009 |
| JP | 4428961 | 3/2010 |
| JP | 2010-237544 | 10/2010 |
| JP | 2011-138043 | 7/2011 |
| JP | 2011-221120 | 11/2011 |
| JP | 2012-8581 | 1/2012 |

* cited by examiner

OPTICAL ELEMENT, OPTICAL SYSTEM AND IMAGING APPARATUS

CROSS-REFERENCE TO RELATED APPLICATION

This application is a continuation application filed under 35 U.S.C. 111(a) claiming the benefit under 35 U.S.C. 120 and 365(c) of PCT International Application No. PCT/JP2013/083637 filed on Dec. 16, 2013, which is based upon and claims the benefit of priority of Japanese Priority Application No. 2012-274956 filed on Dec. 17, 2012 and the entire contents of which are hereby incorporated by reference.

BACKGROUND OF THE INVENTION

1. Field of the Invention

The present invention relates to an optical element, an optical system and an imaging apparatus.

2. Description of the Related Art

In an optical device such as a camera or the like, a diaphragm, a neutral density (ND) filter or the like is used in order to adjust an amount of light that enters into a lens or the like. Recently, a camera is mounted on a mobile phone, a mobile terminal or the like so that a diaphragm is used in such a camera (Patent Document 1, for example).

FIG. 1 illustrates a general diaphragm. A diaphragm 910 includes a tabular member made of a shading material and provided with an open portion 911 at a center portion. Thus, the diaphragm 910 shades light at a peripheral portion and transmits light at the center portion where the open portion 911 is formed. FIG. 1-(a) is a top view of the diaphragm 910 and FIG. 1-(b) illustrates transmittance of light along a dashed line 1A-1B in FIG. 1-(a).

Recently, the size of each camera is becoming smaller in accordance with a smaller size and a thinner size of each mobile phone or each mobile terminal. Thus, the size of each diaphragm is also becoming smaller. However, in the small-size diaphragm 910, generation of diffraction of light at the periphery of the open portion 911 cannot be ignored so that it is becoming difficult to increase resolution. This means that, a small-size diaphragm is required in which resolution is not deteriorated even with a high-pixel camera.

[Patent Document 1] Japanese Laid-open Patent Publication No. 11-231209

[Patent Document 2] Japanese Laid-open Patent Publication No. 2011-221120

[Patent Document 3] Japanese Patent No. 4,428,961

For an optical element that functions as such an optical diaphragm, as illustrated in FIG. 2, an apodizing filter is disclosed in which transmittance of light at a center portion is high and transmittance of light decreases from the center portion toward a peripheral portion. Here, FIG. 2-(a) is a top view of a diaphragm 920 that has an open portion 921 at a center portion, and FIG. 2-(b) illustrates transmittance of light along a dashed line 2A-2B in FIG. 2-(a).

Here, when forming such an optical element using a resin material, there is a case that the optical element is warped in a concave shape or in a convex shape.

As the warped optical element becomes substantially thicker, this may be a problem in particular for a mobile phone or a mobile terminal for which being smaller and thinner are required.

SUMMARY OF THE INVENTION

The present invention is made in light of the above problems, and provides an optical element, in which transmittance of light monotonically decreases from a center portion toward a peripheral portion, without a warp or with a small warp even when the optical element is made of a resin material.

According to an embodiment, there is provided an optical element in which transmittance of light monotonically decreases from a center portion toward a peripheral portion, including a light absorbing portion, made of a material that absorbs a part of or all of visible light, formed at one surface of a transparent substrate such that its thickness monotonically increases from the center portion toward the peripheral portion; a light transmitting portion, made of a material that transmits visible light, formed on the light absorbing portion; and a transparent resin layer, made of a material that transmits visible light, formed at another surface of the transparent substrate, wherein each of the light absorbing portion, the light transmitting portion and the transparent resin layer is made of a resin material.

According to another embodiment, there is provided an optical element in which transmittance of light monotonically decreases from a center portion toward a peripheral portion, including a light absorbing portion, made of a material that absorbs a part of or all of visible light, formed at one surface of a transparent substrate such that its thickness monotonically increases from the center portion toward the peripheral portion; a light transmitting portion, made of a material that transmits visible light, formed on the light absorbing portion; and a transparent film, made of a material that transmits visible light, formed on the light transmitting portion, wherein each of the light absorbing portion and the light transmitting portion is made of a resin material, and wherein the transparent film is made of an inorganic material.

According to another embodiment, there is provided an optical element in which transmittance of light monotonically decreases from a center portion toward a peripheral portion, including a transparent intermediate film, made of a material that transmits visible light, formed at one surface of a transparent substrate; a light absorbing portion, made of a material that absorbs a part of or all of visible light, formed on the transparent intermediate film such that its thickness monotonically increases from the center portion toward the peripheral portion; and a light transmitting portion, made of a material that transmits visible light, formed on the light absorbing portion, wherein each of the light absorbing portion and the light transmitting portion is made of a resin material, and wherein the transparent intermediate film is made of an inorganic material.

DETAILED DESCRIPTION OF THE PREFERRED EMBODIMENTS

First Embodiment

Figure 1:
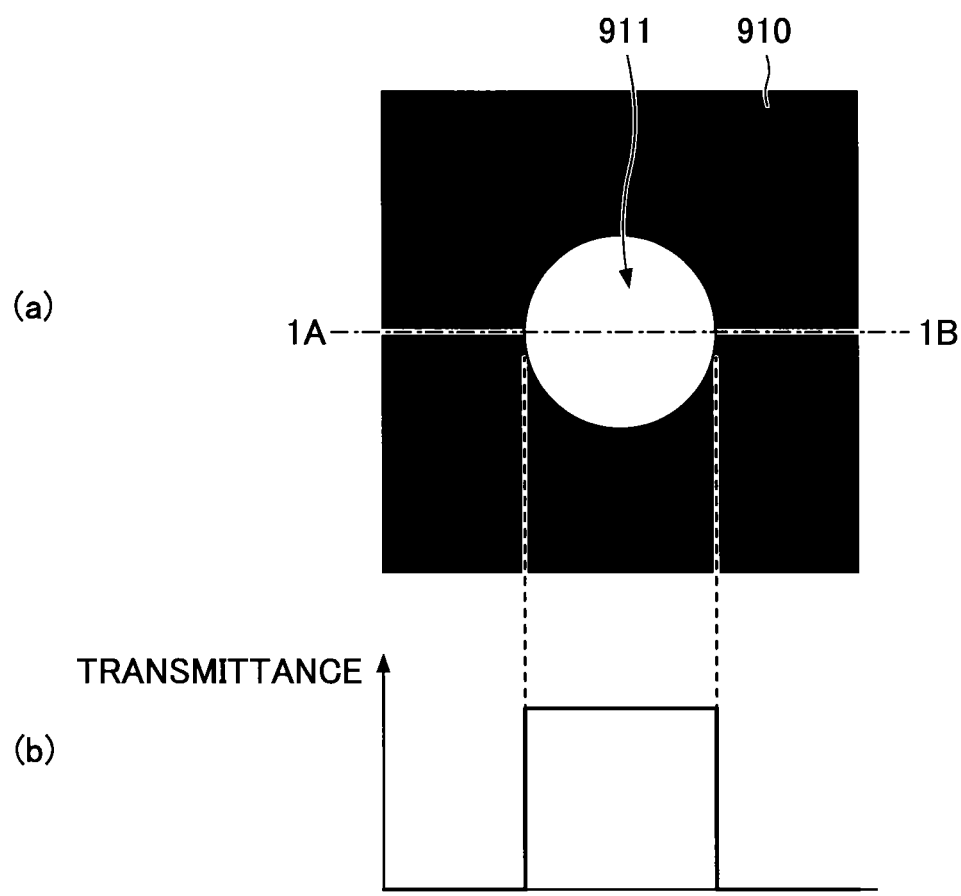
FIG. 1 is a view for explaining a diaphragm.
Figure 2:
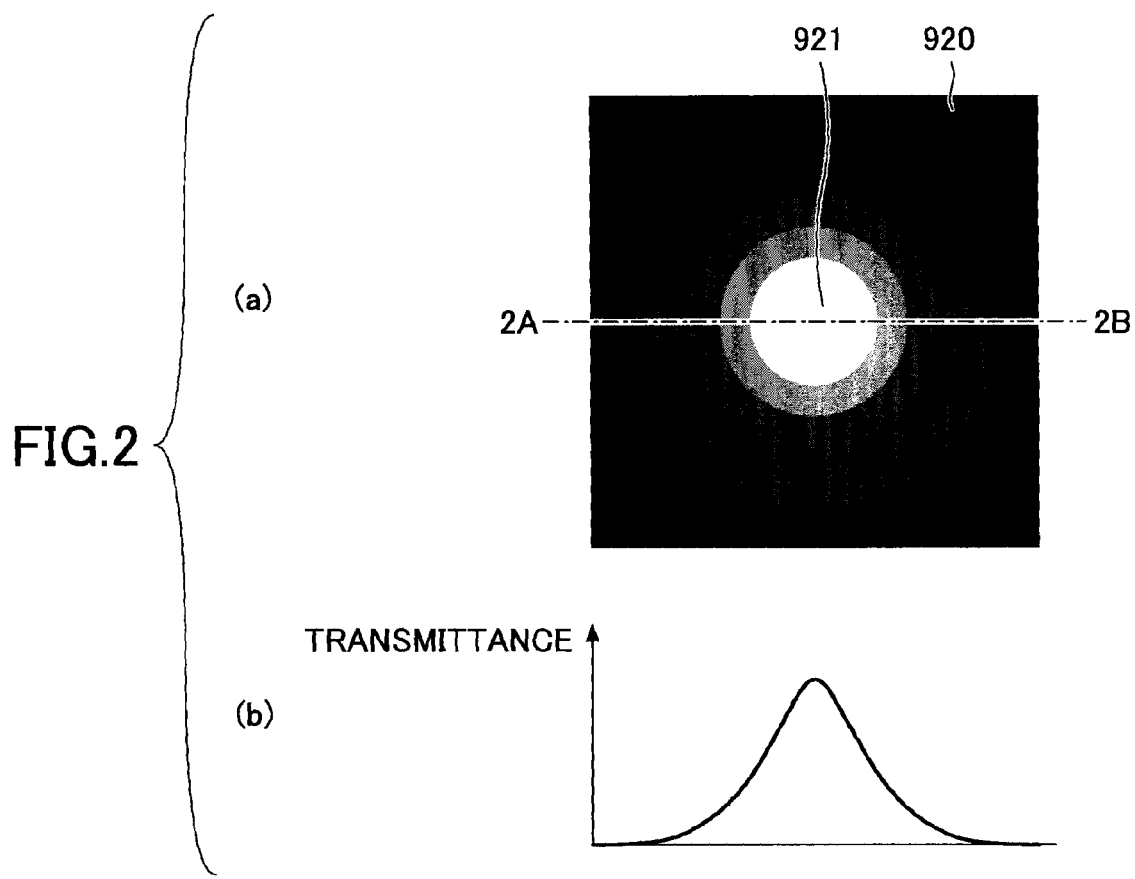
FIG. 2 is a view for explaining an apodizing filter.

The embodiments will be described below. It is to be noted that, in the explanation of the drawings, the same components are given the same reference numerals, and explanations are not repeated.
(Warp of Optical Element)

Figure 3:
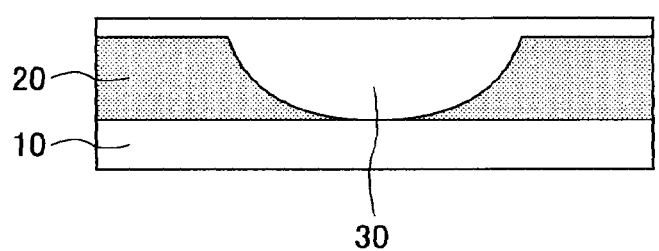
FIG. 3 is a view illustrating a structure of an ideal optical element.

First, a so-called apodizing filter is explained that is an optical element in which transmittance of light gradually decreases from a center portion toward a peripheral portion. As illustrated in FIG. 3, the optical element includes a light absorbing portion 20 made of a material that absorbs visible light and a light transmitting portion 30 made of a material that transmits visible light, formed on a transparent substrate 10. Here, in FIG. 3, the optical element is illustrated to have an ideal shape where no warp or the like is generated.

The light absorbing portion 20 is formed to have a concave shape such that the thickness of the light absorbing portion 20 gradually increases from the center portion toward the peripheral portion. As such, by forming the light absorbing portion 20 such that its thickness gradually becomes thicker from the center portion toward the peripheral portion, the amount of light that passes through the light absorbing portion 20 can be gradually decreased from the center portion toward the peripheral portion. Namely, the transmittance of light can be gradually decreased from the center portion toward the peripheral portion.

The light transmitting portion 30 is formed so as to embed a portion of the concave shape of the light absorbing portion 20. Further, the transparent substrate 10 is made of a transparent resin material such as PET (Polyethylene terephthalate) or the like that transmits visible light. When using such an optical element as a part of an optical system of a camera portion of a mobile phone or the like, it is required for the optical element to be formed thin. Thus, for example, such an optical element is formed such that the thickness of the transparent substrate 10 is about 50 μm, the thickness of the thickest portion of the light absorbing portion 20 is about 25 μm, the thickness of the thinnest portion of the light transmitting portion 30 is about 5 μm, and the total thickness of the optical element is about 80 μm. Here, in this embodiment, it is assumed that the visible light means light whose wavelength is within a range of 420 nm to 780 nm.

Next, an example of manufacturing the optical element illustrated in FIG. 3 using a resin material is explained with reference to FIG. 4 to FIG. 6.

Figure 4:
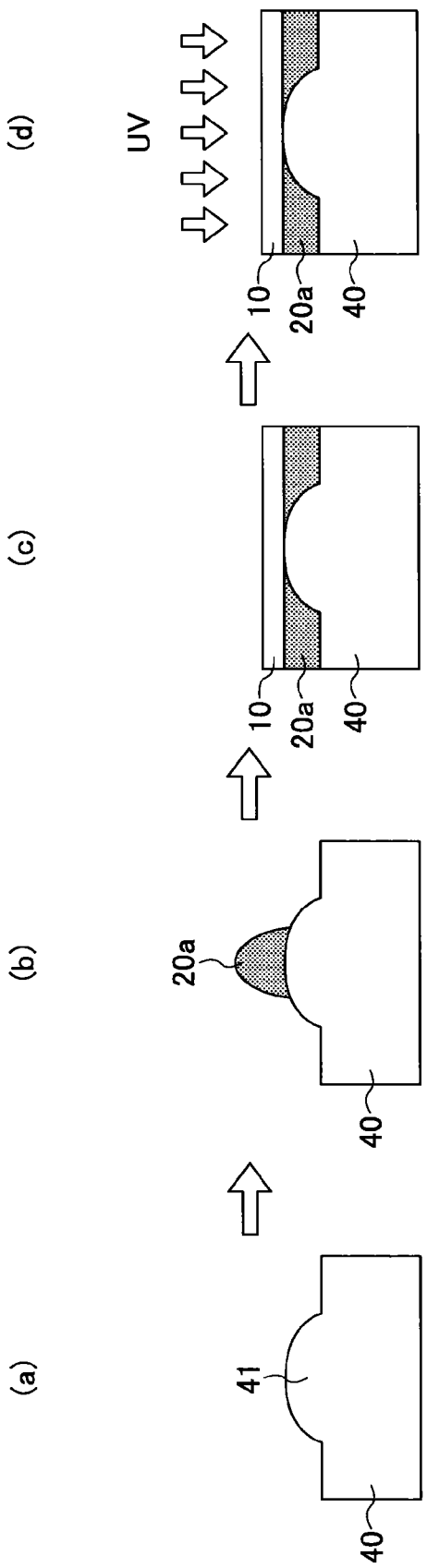
FIG. 4 is a view illustrating manufacturing steps (1) of a method of manufacturing the optical element illustrated in FIG. 3.

First, as illustrated in FIG. 4-(a), a mold 40 for forming the light absorbing portion 20 is prepared. The mold 40 is provided with a convex portion 41 whose height is 25 μm at a center portion. The convex portion 41 has a shape corresponding to the concave shape of the light absorbing portion 20 to be formed. Here, the entirety of the mold 40 may be made of a material such as nickel, stainless, copper, resin or the like; then NiP plating may be performed on the surface and may be processed to be in the convex shape.

Next, as illustrated in FIG. 4-(b), a light absorbing resin material 20a is dropped for forming the light absorbing portion 20. The light absorbing resin material 20a may be a photo-setting resin that is cured by irradiating ultraviolet light, a thermosetting resin or a thermoplastic resin that is cured by heat, or the like, and may include a black material that absorbs light such as titan black, carbon black or the like. An example is explained below in which photo-setting resin is used.

Next, as illustrated in FIG. 4-(c), the transparent substrate 10 is mounted on the dropped light absorbing resin material 20a. For the transparent substrate 10, from a point of view of making it thinner, for example, PET, polycarbonate, olefin-based resin, a glass or the like may be used. The thickness of the transparent substrate 10 may be about 30 μm to 200 μm, and preferably, about 50 μm from a point of view of processability or making it thinner.

Next, as illustrated in FIG. 4-(d), ultraviolet light (UV) is irradiated from a side where the transparent substrate 10 is mounted to cure the light absorbing resin material 20a and to form the light absorbing portion 20. Here, ultraviolet light corresponding to a curing condition of the resin may be appropriately irradiated.

Figure 5:
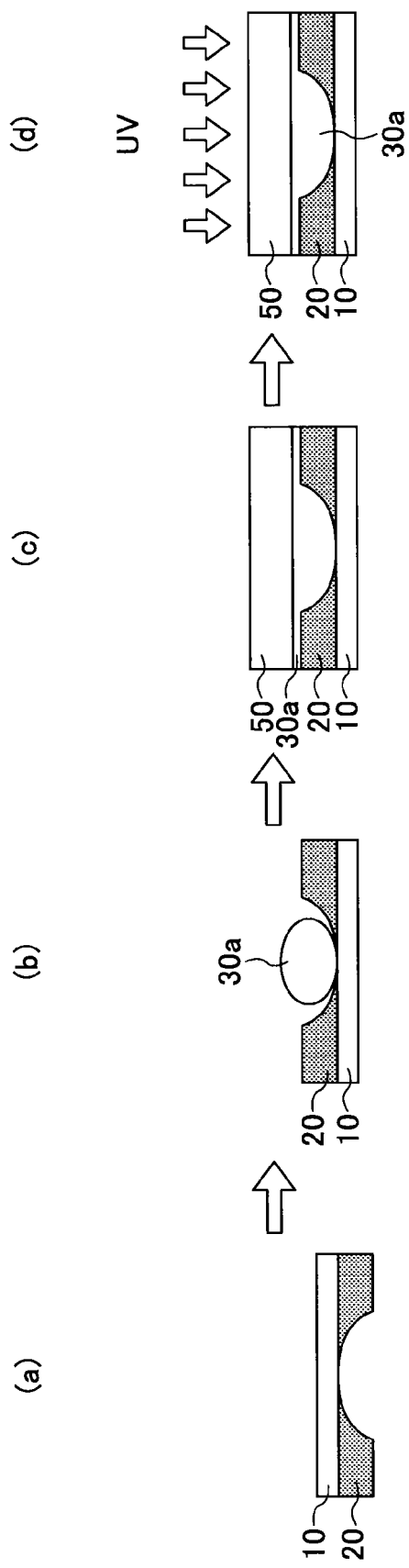
FIG. 5 is a view illustrating manufacturing steps (2) of a method of manufacturing the optical element illustrated in FIG. 3.

Next, as illustrated in FIG. 5-(a), the transparent substrate 10 and the light absorbing portion 20 are released from the mold 40. With this, the light absorbing portion 20 with a concave shape is formed on the transparent substrate 10. Here, the formed light absorbing portion 20 includes a material that absorbs light such as titan black, carbon black or the like. Although not illustrated in the drawings, there is a case in which the transparent substrate 10 is slightly warped such that a surface at which the light absorbing portion 20 is formed has a concave shape due to the shrinkage on curing of the light absorbing resin material 20a.

Next, as illustrated in FIG. 5-(b), a light transmitting resin material 30a is dropped at a portion with the concave shape of the light absorbing portion 20. For the light transmitting resin material 30a, photo-setting resin, thermosetting resin, or thermoplastic resin that passes light may be used. In the following, an example is explained in which photo-setting resin that is cured by irradiating ultraviolet light is used.

Next, as illustrated in FIG. 5-(c), a release substrate 50 is mounted on the dropped light transmitting resin material 30a. The release substrate 50 is made of quartz, for example, and a mold release treatment is performed at its surface in order to easily release a product later. For a mold release treatment agent, an organic component or an inorganic component including fluorine or the like may be used and a surface treatment is performed.

Next, as illustrated in FIG. 5-(d), ultraviolet light is irradiated through the release substrate 50. After irradiating the ultraviolet light, a heat treatment such as annealing or the like may be performed in accordance with necessity. As such, as illustrated in FIG. 6-(a), by irradiating ultraviolet light, the light transmitting resin material 30a is cured and the light transmitting portion 30 is formed.

Figure 6:
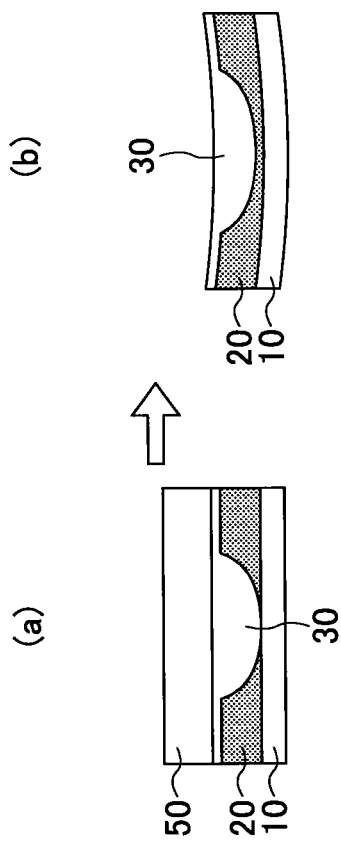
FIG. 6 is a view illustrating manufacturing steps (3) of a method of manufacturing the optical element illustrated in FIG. 3.

Thereafter, as illustrated in FIG. 6-(b), the optical element is manufactured by releasing the release substrate 50. The total thickness of the optical element formed as such is about 80 μm.

Figure 7:
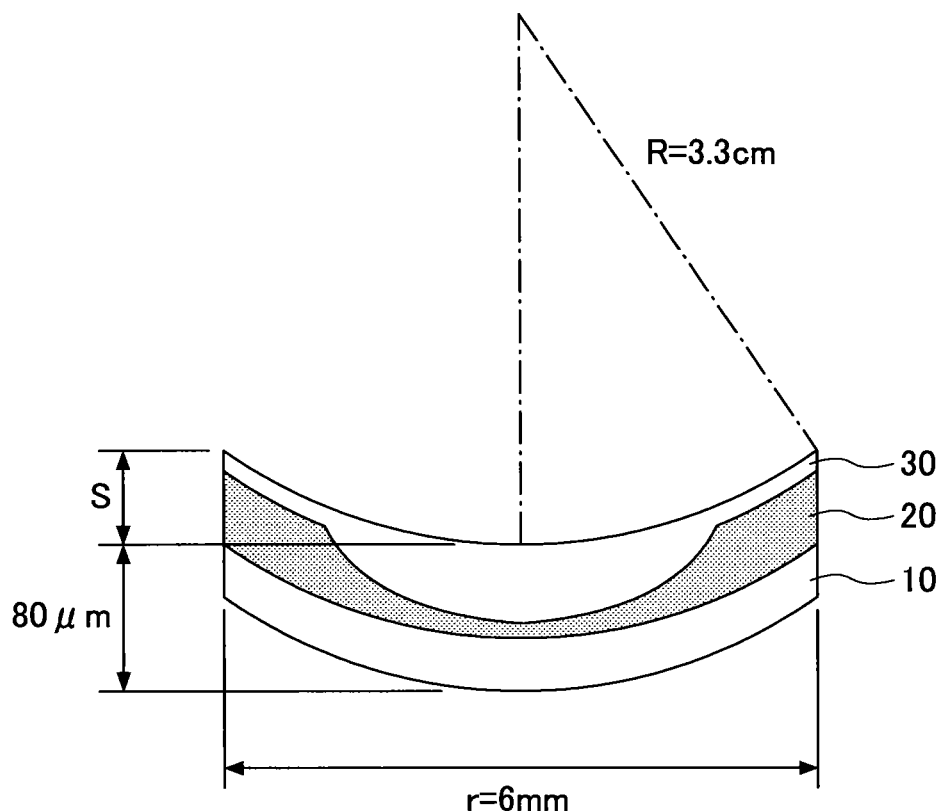
FIG. 7 is a view illustrating a structure of an optical element that is actually manufactured.

In the optical element formed as such, each of the light absorbing portion 20 and the light transmitting portion 30 is made of ultraviolet light curing resin that shrinks when being cured. Thus, as illustrated in FIG. 7, the optical element is warped such that a surface at which the light absorbing portion 20 and the light transmitting portion 30 are formed assumes a concave shape. As such, when the optical element is warped, it is not suitable for an apparatus for which miniaturization is required such as a camera module or the like of a mobile phone because a larger area for mounting the optical element is required. Here, in this embodiment, for each of the light absorbing resin material 20a and the light transmitting resin material 30a, a shrinkage ratio of about 6% is used.

When actually forming an optical element by the above described steps, a surface at which the light transmitting portion 30 is formed was warped to have a concave shape with a radius of curvature R of 3.3 cm. The difference of elevation S, calculated from the radius of curvature R, within a range of an element outline (radius r of 6 mm; ϕ6 mm) at a surface of the optical element was 137 μm.

Here, in this embodiment, the radius of curvature R or the difference of elevation S due to the warp of the optical element was obtained by measurement using a 3D-coordinate measuring machine (NewView 6200 manufactured by Zygo Corporation, or the like, for example) that uses interference of laser or light. Further, as the shape of the warp of the optical element can be substantially approximated to be a spherical shape, the relationship between values of the difference of elevation S at the surface and the radius of curvature R becomes the following equation (1), where "r" is a diameter of the optical element and "S" is a difference of elevation.

$$S = R - \{R^2 - (r/2)^2\}^{1/2} \quad (1)$$

Generally, for a case of a camera module or the like of a mobile phone, the thickness of the optical element is required to be reduced. However, for the optical element manufactured by the above described steps, the sum of the thickness of the optical element and the difference of elevation S at the surface of the optical element becomes 217 μm (80 μm+137 μm), which exceeds the originally designed thickness 80 μm. Thus, it is required to make the difference of elevation S smaller by reducing the warp.

(Optical Element)

Figure 8:
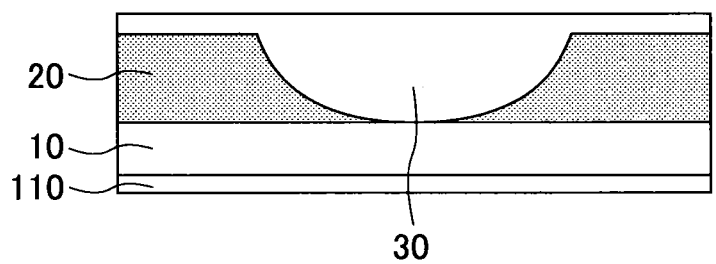
FIG. 8 is a view illustrating a structure of an optical element of a first embodiment.

Next, the optical element of the embodiment is explained. As illustrated in FIG. 8, the optical element of the embodiment has a structure in which a light absorbing portion 20 made of a material that absorbs visible light and a light transmitting portion 30 made of a material that transmits visible light are stacked at one surface of a transparent substrate 10. Further, in the optical element, a transparent resin layer 110 made of a transparent resin material that transmits light is formed at another surface of the transparent substrate 10, opposite of the one surface.

Here, the light absorbing portion 20 has a concave shape that is concave at a center portion, and is formed such that the thickness of the light absorbing portion 20 gradually increases from the center portion toward a peripheral portion. As such, by forming the light absorbing portion 20 such that the thickness of the light absorbing portion 20 gradually becomes greater from the center portion toward the peripheral portion, the amount of light that is transmitted through the light absorbing portion 20 can be gradually decreased from the center portion toward the peripheral portion. Namely, the transmittance of light can be gradually decreased from the center portion toward the peripheral portion.

(Light Absorbing Portion 20)

In the optical element of the embodiment, the light absorbing portion 20 is formed by adding an absorbing material that absorbs light to a transparent resin material that transmits light. Here, the liquid light absorbing resin material 20a, which will be explained later, used for forming the light absorbing portion 20, includes one in which an absorbing material is added in a transparent resin material.

(Absorbing Material)

For the absorbing material, an organic dye or an organic pigment such as anthraquinone-based, phthalocyanine-based, benzimidazolone-based, quinacridone-based, azo-chelate-based, azo-based, isoindolinone-based, pyranthrone-based, indanthrone-based, anthrapyrimidine-based, dibromoanthanthrone-based, flavanthrone-based, perylene-based, perinone-based, quinophthalone-based, thioindigo-based, dioxazine-based, aniline black, nigrosine black or the like; metal nano particles such as gold, silver, copper, tin, nickel, palladium or alloys of these; or an inorganic pigment such as barium sulfate, zinc oxide (zinc flower), lead sulfate, chrome yellow, red iron oxide, ultramarine blue dye, iron blue, chromium oxide, black iron oxide, red lead, zinc sulfide, cadmium yellow, cadmium red, zinc, manganese violet, cobalt, magnetite, carbon black, carbon nanotube, graphene, titan black or the like, may be used. In particular, titan black is preferably used as it has good dispersibility and a high absorption coefficient. As the density of titan black added to the transparent resin material, which will be explained later, can be low, viscosity can be retained low.

Titan black is a low-order titanium oxide compound expressed as TiNxOy ($0 \leq x < 1.5$ and $0.16 < y < 2$) or ($1.0 \leq x + y < 2.0$ and $2x < y$), and its particles can be easily obtained. When used in the optical element, it is preferable that a haze value is small. Thus, it is preferable that an average particle size of the titan black particles of the embodiment is less than or equal to 100 nm, and more preferably, less than or equal to 30 nm. The particle size of particles to be dispersed means a number average particle size of 100 particles in a TEM photograph image of a 100 thousand times-enlarged image of titan black particles included in an organic solvent obtained by a transmission electron microscope (TEM).

In this embodiment, when particles are used, a dispersing agent may be used. Thus, a dispersing agent may be used for titan black. The dispersing agent is used for evenly dispersing the particles in resin. For the dispersing agent, a high-molecular dispersing agent (alkylammonium salt, alkylolammonium salt that is a copolymer including acid radicals), a hydroxyl group containing carboxylate, carboxylic acid containing a copolymer, an amide group containing copolymer, a pigment derivative, a silane coupling agent or the like may be used. Further, the dispersing agent may include a functional group that interacts with resin of a polymerizable functional group in its molecules. Further, these may be independently used or two or more of these may be used in combination.

It is preferable that the ratio of titan black added to the transparent resin material is greater than or equal to 0.3 wt. % and less than or equal to 15 wt. %, and more preferably, between 0.5 wt. % to 13 wt. %. This corresponds to an OD value at 10 μm being greater than or equal to 0.2 and less than or equal to 4.0. When the ratio is less than 0.3 wt. %, the thickness of greater than or equal to 100 μm is necessary in order to actualize desired transmittance so that molding may be very difficult. On the other hand, when the ratio is greater than 15 wt. %, decreasing of transmittance per thickness unit becomes large and it becomes essential that the remaining thickness at the center portion becomes almost zero. In such a case, it is very difficult to manufacture the optical element.

Other materials may be added in addition to titan black. In particular, for carbon black, transmittance monotonically decreases from 800 nm toward 380 nm. As this characteristic is opposite to that of titan black, by combining titan black and carbon black, wavelength dependency of transmittance can be made smaller.

(Transparent Resin Material)

For the transparent resin material, thermoplastic resin such as polyethylene terephthalate (PET), polyethylene naphthalate (PEN), polybutylene terephthalate (PBT), polycarbonate (PC), cycloolefin (COP) or the like, thermosetting resin such as polyimide (PI), polyether imide (PEI), polyamide (PA), polyamide-imide (PAI) or the like, or energy-ray-curable resin such as acryl, epoxy or the like may be used. When the thermosetting resin or the energy-ray-curable resin is used, the absorbing material may be added in a polymeric precursor compound (hereinafter, referred to as "polymerizable compound" as well) such as an oligomer, a monomer or the like, and may be cured thereafter. Among these, the energy-ray-curable resin is preferably used. Such a polymerizable compound is not specifically limited as long as the compound is capable of being cured by a polymerization reaction. For example, but not specifically limiting, radical polymerizable resin, cationic polymerizable resin, or a radical polymerizable compound (monomer) may be used. Among these, the radical polymerizable compound (monomer) is preferably used in points of view of polymerization speed or moldability, which will be explained later. For the radical polymerizable resin, resin including an unsaturated double bond of carbon-carbon such as (meth)acryloyloxy group, (meth)acryloylamino group, (meth)acryloyl group, allyloxy group, allyl group, vinyl group, vinyloxy group or the like may be used.

In this embodiment, the polymerizable compound is not specifically limited, but a monofunctional compound such as ethoxylated o-phenylphenolacrylate, methacrylic acid 2-(perfluorohexyl)ethyl, cyclohexyl(meth)acrylate, isobornyl(meth)acrylate, tricyclodecane(meth)acrylate, tricyclodecanemethanol(meth)acrylate, tricyclodecaneethanol(meth)acrylate, 1-adamantylacrylate, 1-adamantylmethanolacrylate, 1-adamantylethanolacrylate, 2-methyl-2-adamantylacrylate, 2-ethyl-2-adamantylacrylate, 2-propyl-2-adamantylacrylate or the like, a difunctional compound such as 9,9-bis[4-(2-acryloyloxyethoxy)phenyl]fluorene, diethyleneglycoldi(meth)acrylate, 1,3-butanedioldi(meth)acrylate, 1,4-butanedioldi(meth)acrylate, neopentylglycoldi(meth)acrylate, isobornyldi(meth)acrylate, tricyclodecanedi(meth)acrylate, tricyclodecanedimethanoldi(meth)acrylate, tricyclodecanediethanoldi(meth)acrylate, adamantanediacrylate, adamantanedimethanoldiacrylate or the like, a trifunctional compound such as trimethylolpropantri(meth)acrylate or the like, a tetrafunctional compound such as pentaerythritol tetra(meth)acrylate or the like, or a hexafunctional compound such as dipentaerythritolhexa(meth)acrylate or the like may be used. A single polymerizable compound or two or more polymerizable compounds may be included. When only a monofunctional compound is used, there may be a case that a cohesive failure occurs when releasing the compound after molding. Thus, it is preferable that a multifunctional compound greater than or equal to bifunctional is included. It is preferable that the ratio of the multifunctional compound within the polymerizable compound is greater than or equal to 1 wt. % and less than or equal to 90 wt. %, and more preferably, greater than or equal to 10 wt. % and less than or equal to 80 wt. %. If the amount of the multifunctional compound is less than 1 wt. %, an effect of improving the cohesive failure is insufficient. If the amount of the multifunctional compound is greater than 90 wt. %, shrinking after polymerization may be a problem.

Further, other than the above described functional groups including an unsaturated double bond of carbon-carbon, a polymerizable compound such as an epoxy group that can cause a ring-opening reaction may be used. Although not specifically raised in an example, in such a case, it is preferable that a multifunctional compound greater than or equal to bifunctional is included because there may be a case that a cohesive failure occurs when releasing the compound after molding if only a monofunctional compound is included. It is preferable that the ratio of the multifunctional compound within the polymerizable compound is greater than or equal to 1 wt. % and less than or equal to 90 wt. %, and more preferably, greater than or equal to 10 wt. % and less than or equal to 80 wt. %.

(Light Transmitting Portion 30)

In the optical element of the embodiment, the light transmitting portion 30 is formed of the above described transparent resin material. Here, the liquid light transmitting resin material 30a, which will be explained later, used for forming the light transmitting portion 30 includes the above described transparent resin material.

(Transparent Resin Layer 110)

In this embodiment, the transparent resin layer 110 is made of an unsaturated polyester based, urethane-acrylate based, epoxy-acrylate based, or polyester-acrylate based light curing resin that is cured by irradiating ultraviolet light.

In the optical element of the embodiment, the transparent resin layer 110 may be a hard coat layer that protects the surface of the transparent substrate 10 from being damaged. At this time, it is preferable that a material for forming the hard coat layer is harder than a material that composes the transparent substrate 10, and further, it is preferable that it is harder than or equal to H based on pencil hardness (JIS-K-5600 JIS-K-5400). For a material for forming the hard coat layer, it is preferable to use a material in which inorganic particles are dispersed in acrylic based UV curing resin, acrylic based resin, or the like.

Further, the transparent resin layer 110 may be an anti-reflection film (AR coat). Specifically, the transparent resin layer 110 may be a film made of a transparent resin material whose refractive index is low, or a multi-layered film obtained by stacking resin materials whose refractive indexes are different.

Further, the transparent resin layer 110 may be an antistatic film (antistatic coat). Specifically, the transparent resin layer 110 may be a film formed by coating with an ionic conductive antistatic agent such as a long chain alkyl compound including a sulfonic acid group, a polymer including an ionized nitrogen atom at a main chain or the like. Further, the transparent resin layer 110 may be a film formed by coating with an antistatic agent including a conductive material such as tin oxide particles, tin oxide particles in which indium or antimony is doped, or the like.

Further, the transparent resin layer 110 may be formed by coating using a coating method such as spray coating, dipping, roll coating, die coating, spin coating, reverse coating, gravure coating, wire bar coating or the like, or printing using a printing method such as gravure printing, screen printing, offset printing, ink jet printing or the like, and after that, irradiating ultraviolet light or heating.

(Manufacturing Method of Optical Element)

Next, a method of manufacturing the optical element of the embodiment is explained with reference to FIG. 9 to FIG. 11.

Figure 9:
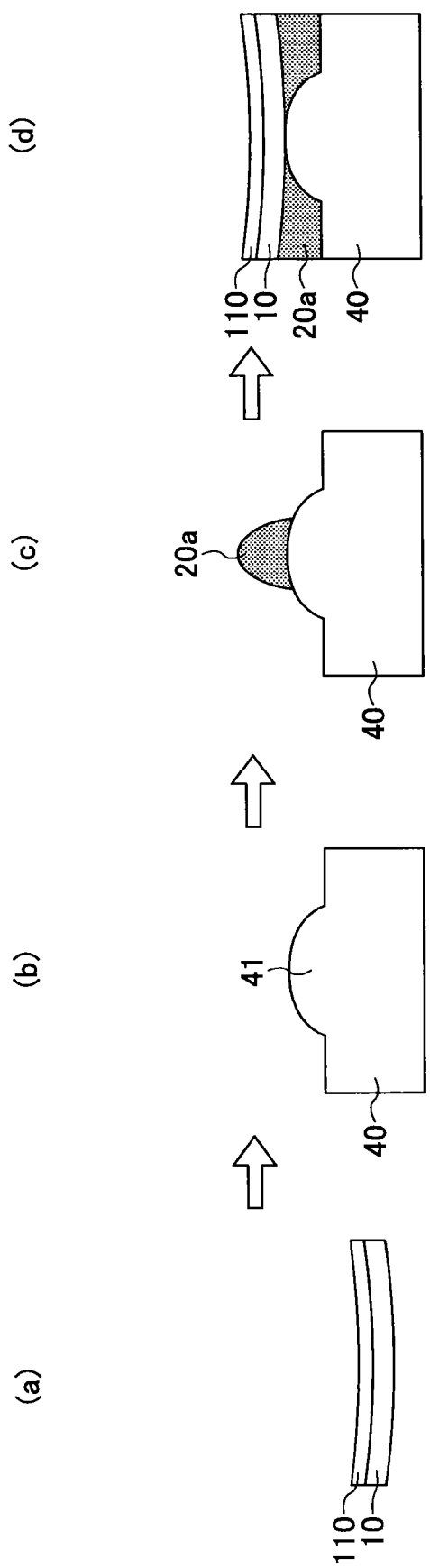
FIG. 9 is a view illustrating manufacturing steps (1) of a method of manufacturing the optical element of the first embodiment.

First, as illustrated in FIG. 9-(a), the transparent resin layer 110 is formed on the other surface of the transparent substrate 10. The transparent resin layer 110 may be formed by coating a resin material for forming the transparent resin layer 110 on the other surface of the transparent substrate 10, and curing it, or the like. As such, shrinkage on curing is generated by curing the resin material, and the transparent substrate 10 is warped such that the other surface at which the transparent resin layer 110 is formed assumes a concave shape. In this embodiment, it is assumed that a hard coat layer with a thickness of 2 µm is formed as the transparent resin layer 110. Due to this, the optical element is warped such that a surface at which the transparent resin layer 110 is formed has a concave shape where the radius of curvature R becomes 9.135 cm. The difference of elevation S within a range of an element outline (radius r of 6 mm; φ6 mm) at the surface of the optical element calculated from the radius of curvature R is about 49 µm. Here, for the transparent substrate 10, for example, a PET film with a thickness of about 50 µm or the like is used.

Next, as illustrated in FIG. 9-(b), a mold 40 is prepared for forming the light absorbing portion 20. The mold 40 is provided with a convex portion 41 whose height is 25 µm at a center portion. The convex portion 41 has a shape corresponding to the concave shape of the light absorbing portion 20 to be formed. Here, the entirety of the mold 40 may be made of a material such as nickel, stainless, copper, resin or the like; then NiP plating may be performed on the surface and may be processed to be in the convex shape.

Next, as illustrated in FIG. 9-(c), a light absorbing resin material 20a is dropped for forming the light absorbing portion 20. The light absorbing resin material 20a may be a photo-setting resin that is cured by irradiating ultraviolet light, a thermosetting resin or a thermoplastic resin that is cured by heat, or the like, and may include a black material that absorbs light such as titan black, carbon black or the like. An example is explained below in which a photo-setting resin is used.

Next, as illustrated in FIG. 9-(d), the transparent substrate 10 is mounted on the dropped light absorbing resin material 20a. At this time, the transparent substrate 10 is mounted such that the one surface, which is an opposite of the other surface at which the transparent resin layer 110 is formed, faces the dropped light absorbing resin material 20a. For the transparent substrate 10, from a point of view of making it thinner, for example, PET, polycarbonate, olefin-based resin, a glass or the like may be used. The thickness of the transparent substrate 10 may be about 30 µm to 200 µm, and preferably, about 50 µm from a point of view of processability or making it thinner.

Figure 10:
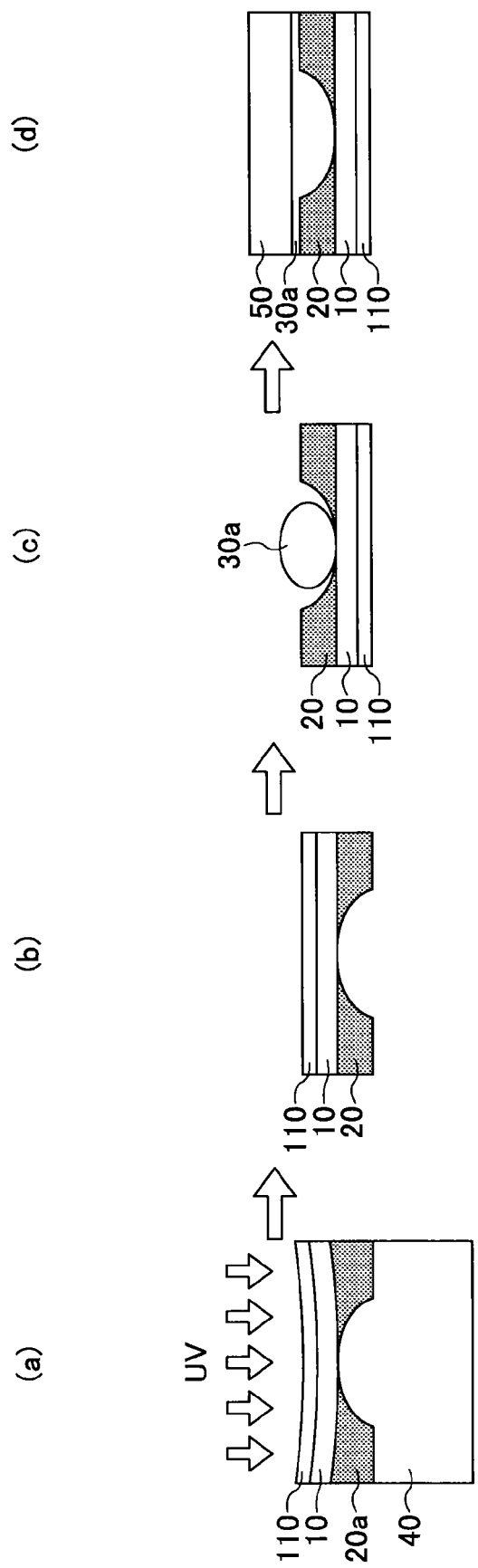
FIG. 10 is a view illustrating manufacturing steps (2) of a method of manufacturing the optical element of the first embodiment.

Next, as illustrated in FIG. 10-(a), ultraviolet light (UV) is irradiated from a side where the transparent substrate 10 is mounted to cure the light absorbing resin material 20a and to form the light absorbing portion 20. Here, ultraviolet light corresponding to a curing condition of the resin may be appropriately irradiated.

Next, as illustrated in FIG. 10-(b), the transparent substrate 10 and the light absorbing portion 20 are released from the mold 40. With this, the light absorbing portion 20 with a concave shape is formed on the transparent substrate 10. Here, the formed light absorbing portion 20 includes a material that absorbs light such as titan black, carbon black or the like. Although not illustrated in the drawings, there is a case in which the transparent substrate 10 is slightly warped such that a surface at the side where the light absorbing portion 20 is formed has a convex shape due to the shrinkage on curing of the resin material for forming the transparent resin layer 110 even when the light absorbing portion 20 is formed.

Next, as illustrated in FIG. 10-(c), the light transmitting resin material 30a is dropped at a portion with the concave shape of the light absorbing portion 20. For the light transmitting resin material 30a, a photo-setting resin, a thermosetting resin, or a thermoplastic resin that passes light may be used. In the following, an example is explained in which a photo-setting resin that is cured by irradiating ultraviolet light is used.

Next, as illustrated in FIG. 10-(d), a release substrate 50 is mounted on the dropped light transmitting resin material 30a. The release substrate 50 is made of quartz, for example, and a mold release treatment is performed at its surface in order to easily release a product later. For a mold release treatment agent, an organic component or an inorganic component including fluorine or the like may be used and a surface treatment is performed.

Figure 11:
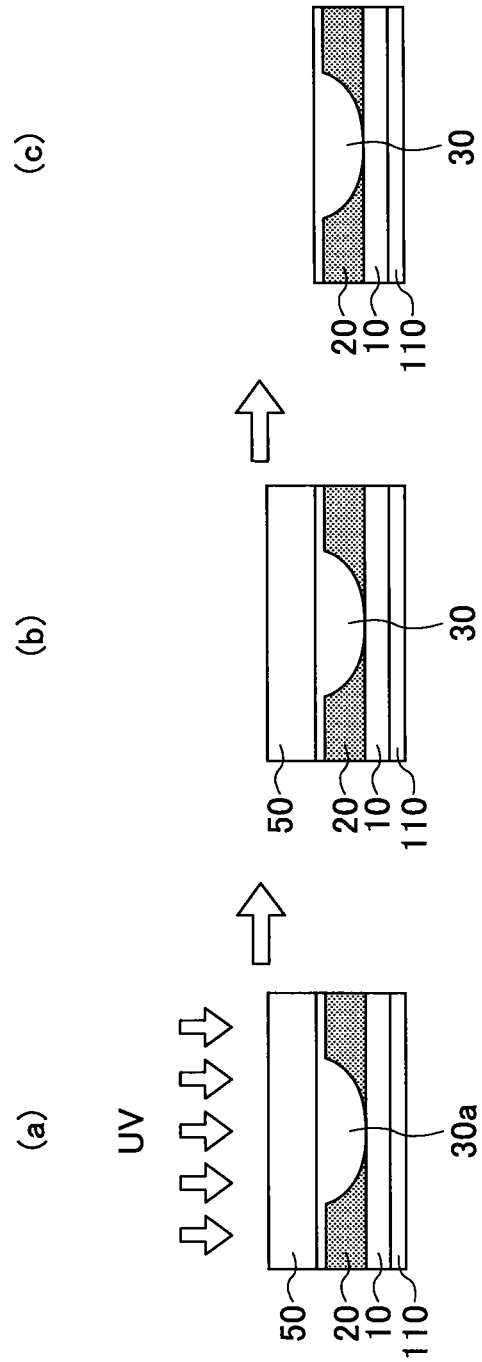
FIG. 11 is a view illustrating manufacturing steps (3) of a method of manufacturing the optical element of the first embodiment.

Next, as illustrated in FIG. 11-(a), ultraviolet light is irradiated through the release substrate 50. After irradiating the ultraviolet light, a heat treatment such as annealing or the like may be performed in accordance with necessity.

As such, as illustrated in FIG. 11-(b), by irradiating the ultraviolet light, the light transmitting resin material 30a is cured and the light transmitting portion 30 is formed.

Thereafter, as illustrated in FIG. 11-(c), the optical element is manufactured by releasing the release substrate 50. The total thickness of the optical element formed as such is about 82 µm.

In the optical element of the embodiment, the light absorbing portion 20 and the light transmitting portion 30 made of ultraviolet light curing resin are formed at the one surface of the optical element, and they shrink when being cured. Thus, a stress is generated that may make the surface at which the light absorbing portion 20 and the light transmitting portion 30 are formed assume a concave shape. However, as the transparent resin layer 110 made of ultraviolet light curing resin is formed at the other surface, the stress is compensated for and canceled by a stress caused by the transparent resin layer 110. Thus, the optical element without warp or with a small warp, as illustrated in FIG. 8, can be obtained.

Here, there may be a case that a transparent resin layer similar to the transparent resin layer 110 is formed on the light transmitting portion 30 by a similar method for protecting the optical element, for an antireflection function, or for an antistatic function; however, that causes an increase in the warp of the optical element and it is not preferable to form such a transparent resin layer in a point of view of the warp.

Thus, according to the embodiment, the warp of the surface of the optical element can be made smaller compared with a case where the transparent resin layer 110 is not formed as illustrated in FIG. 7, and the difference of elevation S at the surface of the optical element can be made smaller. Thus, the optical element of the embodiment is suitable for a camera module or the like of a mobile phone. Here, in this embodiment, for each of the light absorbing resin material 20a and the light transmitting resin material 30a, a shrinkage ratio of about is 6% is used.

(Difference of Elevation S of Optical Element of Embodiment)

Next, the difference of elevation S of the optical element of the embodiment is explained. Here, when curing a layer made of a resin material, shrinkage on curing is generated and tensile stress as remaining stress is generated due to contraction stress, and that causes generation of a warp of an optical element. With this, a warp is generated in the optical element such that the surface at which a layer made of the resin material is formed becomes a concave shape. The relationship between the stress and the warp (radius of curvature R) can be expressed as the following Equation 1, which is a Stoney equation. Here, in Equation 1, "R" is radius of curvature, "E" is Young's modulus of the substrate, "γ" is Poisson's ratio of the substrate, "$t_s$" is the thickness of the substrate, "$t_f$" is the thickness of a film that is formed on the substrate, and "σ" is stress.

$$R = \frac{E \cdot t_s^2}{6 \cdot (1-\gamma) \cdot \sigma \cdot t_f} \quad \text{[Equation 1]}$$

Equation 1 is satisfied when $t_f \ll t_s$, and when the thickness of the film made of the resin material is thin. It is considered that contraction stress of the entirety of the film made of the resin material is relative to the shrinkage ratio, and is relative to the thickness of the film made of the resin material. Thus, the relationships between the shrinkage ratio and the thickness, and the radius of curvature R become, R ∝ 1/(the shrinkage ratio of the resin material), R ∝ 1/(the thickness of the film made of the resin material), respectively. Namely, the radius of curvature R becomes proportional to 1/(the shrinkage ratio of the resin material) or proportional to 1/(the thickness of the film made of the resin material), respectively. Thus, when films made of resin materials are formed at both surfaces of the substrate, respectively, the stresses generated by the films cancel each other and the warp can also be canceled.

When it is assumed that "$R_1$" is the radius of curvature due to a warp generated by forming the light absorbing portion 20 and the light transmitting portion 30 at the one surface of the transparent substrate 10, which is the transparent substrate 10, and "$R_2$" is the radius of curvature due to a warp generated by forming the transparent resin layer 110 at the other surface of the transparent substrate 10, the radius of curvature R of the warp of the transparent substrate 10 is expressed as the following Equation 2.

[Equation 2]

$$\frac{1}{R} = \frac{1}{R_1} + \frac{1}{R_2}$$

In the optical element of the embodiment, as described above, when it is assumed that the radius of curvature $R_1$ is 3.3 cm and the radius of curvature $R_2$ is 9.135, the radius of curvature R becomes 5.166 cm based on Equation 2. When calculating the difference of elevation S within a range of an element outline (radius r of 6 mm; φ6 mm) at the surface of the optical element due to the warp based on the radius of the curvature R using the above described Equation (1), the difference of elevation S becomes 87.1 μm. Thus, in the optical element, the sum of the thickness of the optical element and the difference of elevation S at the surface of the optical element becomes 169.1 μm, and the sum of the thickness of the optical element and the difference of elevation S at the surface of the optical element can be reduced about 20%.

For example, in order to reduce the warp more than or equal to 10% with respect to the optical element without the transparent resin layer 110, it is required to satisfy the following Equations (2) and (3), where "$Z1$" is the absolute value of the remaining stress due to the light absorbing portion 20 and the light transmitting portion 30, and "$Z2$" is the absolute value of the remaining stress of the transparent resin layer 110.

$$0.1 \times Z1 < Z2 \quad (2)$$

$$Z2 < 1.9 \times Z1 \quad (3)$$

Here, $$Z1 < Z2 < 1.9 \times Z1 \quad (4)$$

Within a range that satisfies the above described Equation (4), according to the optical element of the embodiment, a warp is generated such that the surface at which the transparent resin layer 110 is formed becomes a concave shape, which warps in a direction opposite from the direction of the warp of the optical element for the case when the transparent resin layer 110 is not formed. From a point of view reducing the warp, there is no problem when the direction of the warp of the optical element becomes opposite; however, as it is preferable to reduce the warp by low remaining stress and to form the optical element closer to a flat shape without a warp, it is preferable that the above described Equation (2) and the following Equation (5) are satisfied.

$$Z2 \leq Z1 \quad (5)$$

Here, as described above, it is considered that contraction stress of the entirety of the film made of the resin material is relative to the shrinkage ratio, and is relative to the thickness of the film made of the resin material. Thus, when it is assumed that "t1" is the total thickness of the light absorbing portion 20 and the light transmitting portion 30, "t2" is the thickness of the transparent resin layer 110, "S1" is shrinkage ratio of a resin material that composes the light absorbing portion 20 and the light transmitting portion 30, and "S2" is shrinkage ratio of a resin material that composes the transparent resin layer 110, the following Equation (6) can be obtained from the above described Equation (2), and the following Equation (7) can be obtained from the above described Equation (5).

$$0.1 \times S1 \times t1 < S2 \times t2 \quad (6)$$

$$S2 \times t2 \leq S1 \times t1 \quad (7)$$

Further, when it is assumed that the resin material used for forming the light absorbing portion 20, the light transmitting portion 30 and the transparent resin layer 110 is acrylic based resin, generally, shrinkage ratio of acrylic based resin is 2 to 10%. Thus, it can be considered that S1 and S2 become 2 to 10%, respectively.

In the above described Equation (6), when S1 becomes the minimum and S2 becomes the maximum, namely, when S1 is 2% and S2 is 10%, the following Equation (8) can be obtained. Further, when S1 becomes the maximum and S2 becomes the minimum, namely, when S1 is 10% and S2 is 2%, the following Equation (9) can be obtained. Here, when S1 and S2 are equal, the following Equation (10) can be obtained.

$$0.1 \times 2\% \times t1 < 10\% \times t2$$

$$0.02 \times t1 < t2 \quad (8)$$

$$0.1 \times 10\% \times t1 < 2\% \times t2$$

$$0.5 \times t1 < t2 \quad (9)$$

$$0.1 \times t1 < t2 \quad (10)$$

Further, in the above described Equation (7), when S1 becomes the minimum and S2 becomes the maximum, namely, when S1 is 2% and S2 is 10%, the following Equation (11) can be obtained. Further, when S1 becomes the maximum and S2 becomes the minimum, namely, when S1 is 10% and S2 is 2%, the following Equation (12) can be obtained. Here, when S1 and S2 are equal, the following Equation (13) can be obtained.

$$10\% \times t2 \leq 2\% \times t1$$

$$t2 \leq 0.2 \times t1 \quad (11)$$

$$2\% \times t2 \leq 10\% \times t1$$

$$t2 \leq 5 \times t1 \quad (12)$$

$$t2 \leq t1 \quad (13)$$

Thus, the relationship between t1 and t2, assuming that the resin material used for forming the light absorbing portion 20, the light transmitting portion 30 and the transparent resin layer 110 is acrylic based resin, becomes as expressed in the following Equation (14), when it is broadest.

$$0.02 \times t1 < t2 \leq 5 \times t1 \quad (14)$$

Next, examples of the embodiment are explained with reference to Table 1. Here, for the "amount of warp" in Table 1, a positive value expresses that a warp is generated such that a surface at which the light absorbing portion 20 and the light transmitting portion 30 are formed assumes a concave shape.

TABLE 1

| | TRANSPARENT SUBSTRATE | THICKNESS OF TRANSPARENT SUBSTRATE | THICKNESS OF TRANSPARENT RESIN LAYER (t2) | ADDITIONAL FUNCTION | RADIUS OF CURVATURE (cm) |
|---|---|---|---|---|---|
| EXAMPLE 1 | PET | 50 μm | — | — | — |
| EXAMPLE 2 | PET | 50 μm | 5 μm | HARD COAT | 4.7 |
| EXAMPLE 3 | PET | 50 μm | 1 μm | ANTI-REFLECTION FILM | 4.8 |
| EXAMPLE 4 | PET | 50 μm | 2 μm | HARD COAT | 9.135 |

| | AMOUNT OF WARP OF ONLY SUBSTRATE φ6 (μm) | THICKNESS OF LIGHT ABSORBING PORTION AND LIGHT TRANSMITTING PORTION (t1) | t2/t1 | AMOUNT OF WARP OF OPTICAL ELEMENT φ6 (μm) | REDUCED AMOUNT OF WARP |
|---|---|---|---|---|---|
| EXAMPLE 1 | — | 30 μm | — | 137 | — |
| EXAMPLE 2 | −97 | 30 μm | 0.17 | 41 | 70% |
| EXAMPLE 3 | −93 | 30 μm | 0.03 | 44 | 68% |
| EXAMPLE 4 | −49 | 30 μm | 0.07 | 88 | 36% |

Example 1

The optical element of Example 1 corresponds to a comparative example, and in which the light absorbing portion 20 and the light transmitting portion 30 are formed at the one surface of the transparent substrate 10, but the transparent resin layer 110 is not formed at the other surface of the transparent substrate 10. Specifically, the light absorbing portion 20 and the light transmitting portion 30 whose thickness t1 is 30 μm are formed at the one surface of the transparent substrate 10, which is made of PET with a thickness of 50 μm, but a transparent resin layer is not formed at the other surface. The amount of warp of φ6 mm of the optical element of Example 1 was 137 μm. Here, for the optical element of Example 1, lumirror U32 (manufactured by Toray Industries, Inc.) was used for a substrate that becomes the transparent substrate 10.

Example 2

The optical element of Example 2 corresponds to an example of the embodiment, in which the light absorbing portion 20 and the light transmitting portion 30 are formed at the one surface of the transparent substrate 10, and the transparent resin layer 110 is formed at the other surface of the transparent substrate 10. Specifically, the light absorbing portion 20 and the light transmitting portion 30 whose thickness t1 is 30 μm are formed at the one surface of the transparent substrate 10, which is made of PET with a thickness of 50 μm, and the transparent resin layer 110 whose thickness t2 is 5 μm is formed at the other surface of the transparent substrate 10. Thus, t2/t1 becomes 0.17. The amount of warp of φ6 mm of the optical element of Example 2 was 41 μm, where the reduced amount of the warp with respect to the warp of the optical element of Example 1 was 70%. Here, for the optical element of Example 2, KB film 50G1SBF (manufactured by Kimoto Co., Ltd.) was used, and the transparent resin layer 110 that functions as a hard coat is formed at the other surface of the transparent substrate 10. The amount of warp of φ6 mm of the substrate itself was −97 μm, and the radius of curvature was 4.7 cm.

Example 3

The optical element of Example 3 corresponds to an example of the embodiment in which the light absorbing portion 20 and the light transmitting portion 30 are formed at the one surface of the transparent substrate 10 and the transparent resin layer 110 is formed at the other surface. Specifically, the light absorbing portion 20 and the light transmitting portion 30 whose thickness t1 is 30 μm are formed at the one surface of the transparent substrate 10, which is made of PET with a thickness of 50 μm, and the transparent resin layer 110 whose thickness t2 is 1 μm is formed at the other surface of the transparent substrate 10. Thus, t2/t1 becomes 0.03. The amount of warp of φ6 mm of the optical element of Example 3 was 44 μm, where the reduced amount of the warp with respect to the warp of the optical element of Example 1 was 68%. Here, for the optical element of Example 3, LR50-WC (manufactured by OIKE & Co., Ltd.) was used, and the transparent resin layer 110 that functions as an antireflection film is formed at the other surface of the transparent substrate 10. The amount of warp of φ6 mm of the substrate itself was −93 μm, and the radius of curvature was 4.8 cm.

Example 4

The optical element of Example 4 corresponds to an example of the embodiment in which the light absorbing portion 20 and the light transmitting portion 30 are formed at the one surface of the transparent substrate 10 and the transparent resin layer 110 is formed at the other surface of the transparent substrate 10. Specifically, the light absorbing portion 20 and the light transmitting portion 30 whose thickness t1 is 30 μm are formed at the one surface of the transparent substrate 10, which is made of PET with a thickness of 50 μm, and the transparent resin layer 110 whose thickness t2 is 2 μm is formed at the other surface of the transparent substrate 10. Thus, t2/t1 becomes 0.07. The amount of warp of φ6 mm of the optical element of Example 4 was 88 μm, where the reduced amount of the warp with respect to the warp of the optical element of Example 1 was 36%. Here, for the optical element of Example 4, a film manufactured by TOYOHOZAI Co., Ltd. was used, and the transparent resin layer 110 that functions as a hard coat is formed at the other surface of the transparent substrate 10. The amount of warp of φ6 mm of the substrate itself was −49 μm, and the radius of curvature was 9.135 cm.

As described above, all of the optical elements of Example 2 to Example 4 that are the optical elements of the embodiment satisfy the above described Equation (14), and are capable of reducing the amount of warp of the optical elements, respectively.

Second Embodiment

Optical Element

Figure 12:
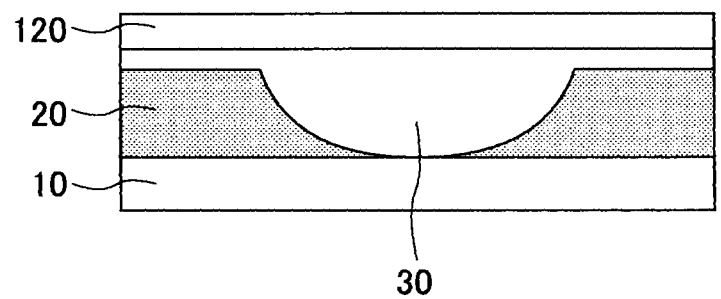
FIG. 12 is a view illustrating a structure of an optical element of a second embodiment.

Next, the optical element of the second embodiment is explained. As illustrated in FIG. 12, the optical element of the embodiment has a structure in which the light absorbing portion 20 made of a material that absorbs visible light and the light transmitting portion 30 made of a material that transmits visible light are stacked at the one surface of the transparent substrate 10, and a transparent film 120 that has compressive stress is formed on the light transmitting portion 30. The transparent film 120 has a single or a plurality of functions selected from, for example, an antireflection film, a hard coat function for protecting the surface from being damaged, an antistatic function and the like, and is formed by a deposition method such as vacuum deposition or sputtering. The transparent film 120 is made of a material that transmits visible light, and is made of an inorganic material such as $SiO_2$ (silicon oxide), $Ta_2O_5$ (tantalum pentoxide), $TiO_2$ (titanium oxide), $ZrO_2$ (zirconium oxide), $HfO_2$ (hafnium oxide), $MgF_2$ (magnesium fluoride) or the like. In particular, when the transparent film 120 is formed by a film made of $SiO_2$ or including $SiO_2$, compressive stress is easily generated in the transparent film 120. Here, when the transparent film 120 is an antireflection film, the film is formed by alternately stacking two kinds of materials whose refractive indexes are different among the above described materials. Further, in order to actualize the antistatic function, the transparent film 120 may be made of a conductive material such as tin oxide, tin oxide in which indium or antimony is doped.

In the optical element of the embodiment, the transparent film 120 with compressive stress can be formed by the film deposition method such as vacuum deposition or sputtering with the above described material. As such, as the transparent film 120 has compressive stress, tensile stress caused by the light absorbing portion 20 and the light transmitting portion 30 is canceled and the optical element without a warp or the optical element with a small warp can be formed.

(Method of Manufacturing Optical Element)

Next, a method of manufacturing the optical element of the embodiment is explained with reference to FIG. 13 to FIG. 15.

Figure 13:
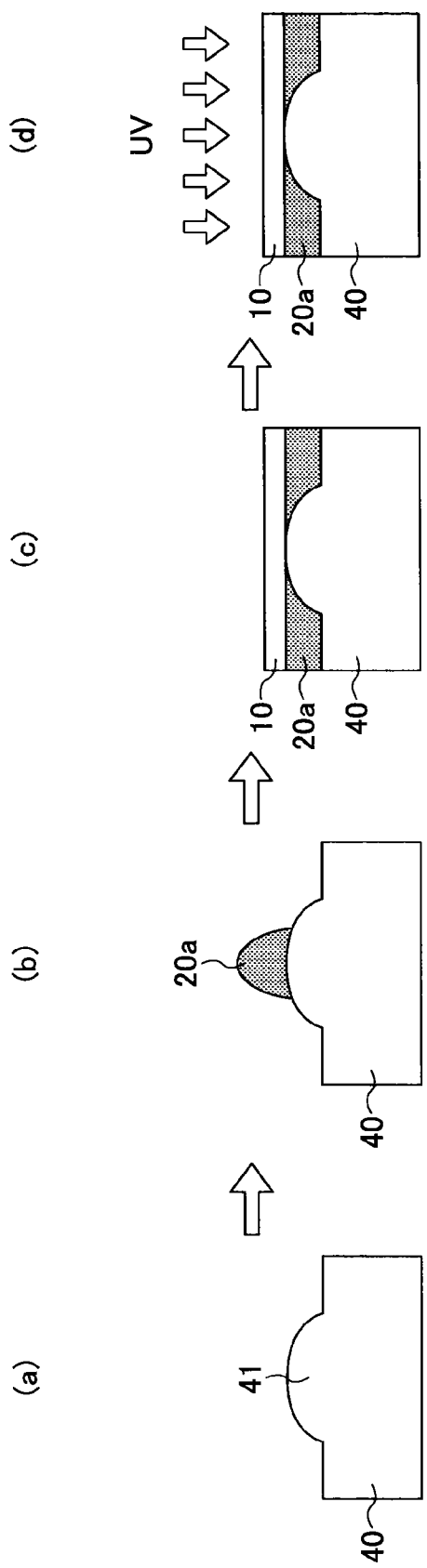
FIG. 13 is a view illustrating manufacturing steps (1) of a method of manufacturing the optical element of the second embodiment.

First, as illustrated in FIG. 13-(a), a mold 40 for forming the light absorbing portion 20 is prepared. The mold 40 is provided with a convex portion 41 whose height is 25 μm at a center portion. The convex portion 41 has a shape corresponding to the concave shape of the light absorbing portion 20 to be formed. Here, the entirety of the mold 40 may be made of a material such as nickel, stainless, copper, resin or the like; then NiP plating may be performed on the surface and may be processed to be in the convex shape.

Next, as illustrated in FIG. 13-(b), a light absorbing resin material 20a is dropped for forming the light absorbing portion 20. The light absorbing resin material 20a may be a photo-setting resin that is cured by irradiating ultraviolet light, a thermosetting resin or a thermoplastic resin that is cured by heat, or the like, and may include a black material that absorbs light such as titan black, carbon black or the like. An example is explained below in which photo-setting resin is used.

Next, as illustrated in FIG. 13-(c), the transparent substrate 10 is mounted on the dropped light absorbing resin material 20a. For the transparent substrate 10, from a point of view of making it thinner, for example, PET, polycarbonate, olefin-based resin, a glass or the like may be used. The thickness of the transparent substrate 10 may be about 30 µm to 200 µm, and preferably, about 50 µm from a point of view of processability or making it thinner.

Next, as illustrated in FIG. 13-(d), ultraviolet light (UV) is irradiated from a side where the transparent substrate 10 is mounted to cure the light absorbing resin material 20a and to form the light absorbing portion 20. Here, ultraviolet light corresponding to a curing condition of the resin may be appropriately irradiated.

Figure 14:
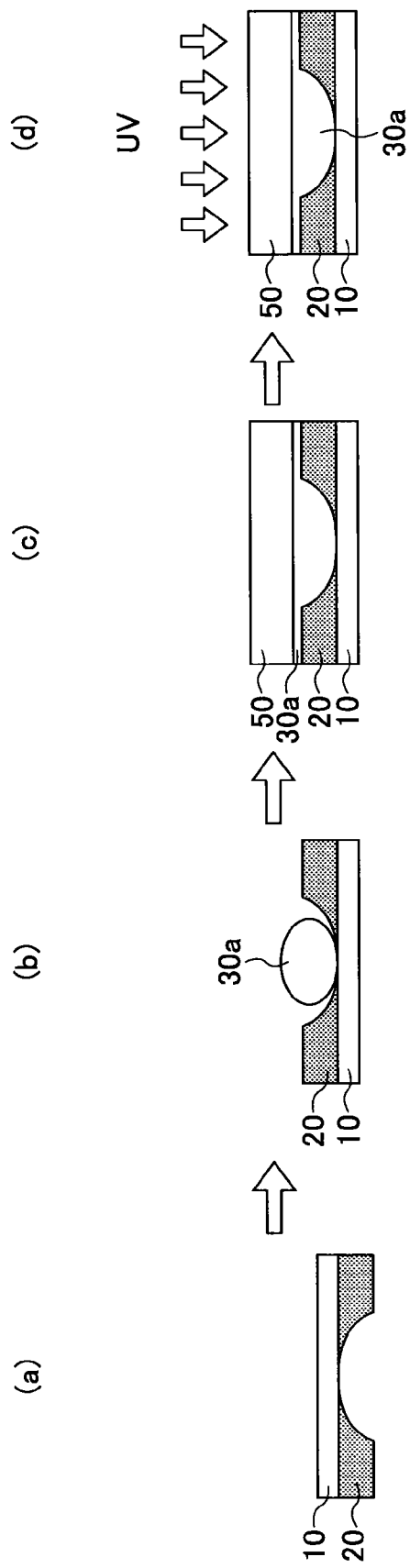
FIG. 14 is a view illustrating manufacturing steps (2) of a method of manufacturing the optical element of the second embodiment.

Next, as illustrated in FIG. 14-(a), the transparent substrate 10 and the light absorbing portion 20 are released from the mold 40. With this, the light absorbing portion 20 with a concave shape is formed on the transparent substrate 10. Here, the formed light absorbing portion 20 includes a material that absorbs light such as titan black, carbon black or the like. Although not illustrated in the drawings, there is a case in which the transparent substrate 10 is slightly warped such that a surface at the side where the light absorbing portion 20 is formed has a concave shape due to the shrinkage on curing of the light absorbing resin material 20a.

Next, as illustrated in FIG. 14-(b), a light transmitting resin material 30a is dropped at a portion with the concave shape of the light absorbing portion 20. For the light transmitting resin material 30a, photo-setting resin, thermosetting resin, or thermoplastic resin that passes light may be used. In the following, an example is explained in which photo-setting resin that is cured by irradiating ultraviolet light is used.

Next, as illustrated in FIG. 14-(c), a release substrate 50 is mounted on the dropped light transmitting resin material 30a. The release substrate 50 is made of quartz, for example, and a mold release treatment is performed at its surface in order to easily release a product later. For a mold release treatment agent, an organic component or an inorganic component including fluorine or the like may be used and a surface treatment is performed.

Next, as illustrated in FIG. 14-(d), ultraviolet light is irradiated through the release substrate 50. After irradiating the ultraviolet light, a heat treatment such as annealing or the like may be performed in accordance with necessity.

Figure 15:
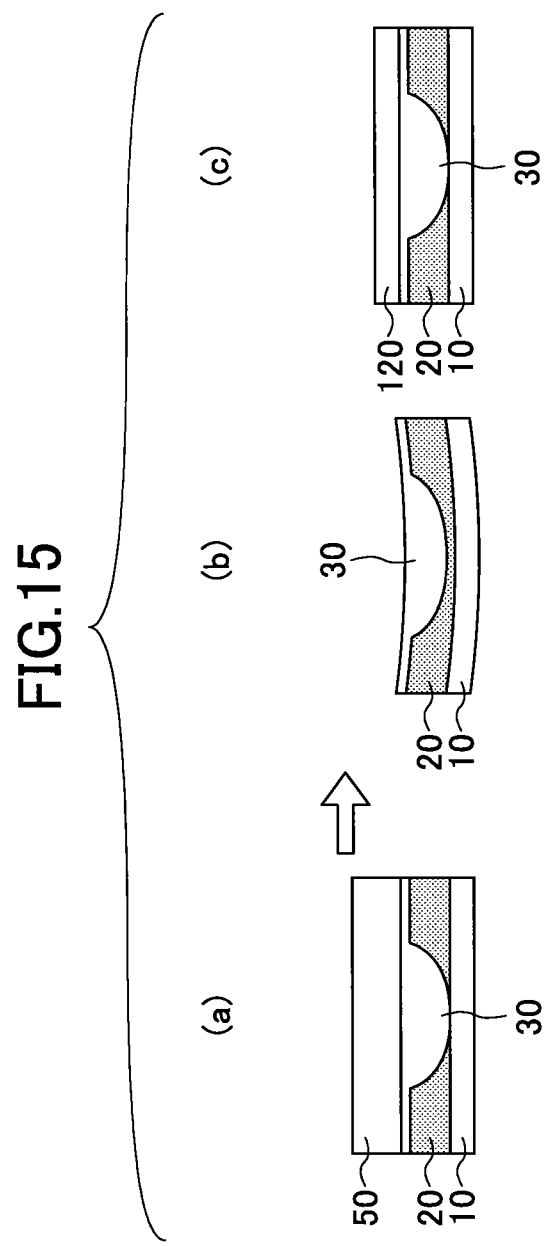
FIG. 15 is a view illustrating manufacturing steps (3) of a method of manufacturing the optical element of the second embodiment.

As such, as illustrated in FIG. 15-(a), by irradiating ultraviolet light, the light transmitting resin material 30a is cured and the light transmitting portion 30 is formed.

Next, as illustrated in FIG. 15-(b), the optical element is manufactured by releasing the release substrate 50. At this state, the transparent substrate 10 is warped such that the surface at which the light transmitting portion 30 is formed becomes a concave shape.

Next, as illustrated in FIG. 15-(c), an antireflection film that is the transparent film 120 is formed on the light transmitting portion 30 by alternately stacking silicon oxide and titanium oxide for a predetermined thickness by sputtering or the like. As the antireflection film, that is the transparent film 120, formed as such has compressive stress, the tensile stress of the light absorbing portion 20 and the light transmitting portion 30 is canceled and the optical element without a warp or the optical element with a small warp can be formed.

Here, other than the above described are the same as those of the first embodiment.

Third Embodiment

Optical Element

Figure 16:
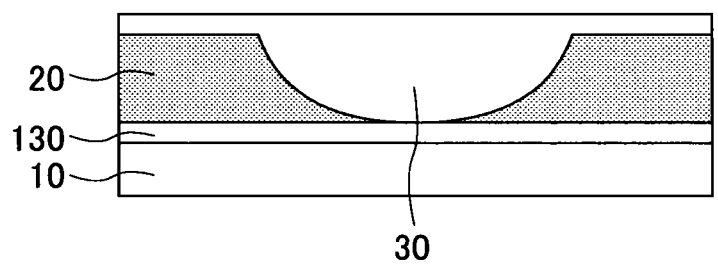
FIG. 16 is a view illustrating a structure of an optical element of a third embodiment.

Next, the optical element of the third embodiment is explained. As illustrated in FIG. 16, the optical element has a structure in which a transparent intermediate film 130 made of a material that transmits visible light is formed at the one surface of the transparent substrate 10, and the light absorbing portion 20 made of a material that absorbs visible light and the light transmitting portion 30 made of a material that transmits visible light are stacked on the transparent intermediate film 130. The transparent intermediate film 130 has compressive stress, and for example, is made $SiO_2$ (silicon oxide) or the like formed by a deposition method such as vacuum deposition or sputtering. The transparent intermediate film 130 may be formed of the materials described above for forming the transparent film 120 of the second embodiment.

In the optical element of the embodiment, as the transparent film 130 has compressive stress, tensile stress caused by the light absorbing portion 20 and the light transmitting portion 30 is canceled and the optical element without a warp or the optical element with a small warp can be formed.

(Method of Manufacturing Optical Element)

Next, a method of manufacturing the optical element of the embodiment is explained with reference to FIG. 17 to FIG. 19.

Figure 17:
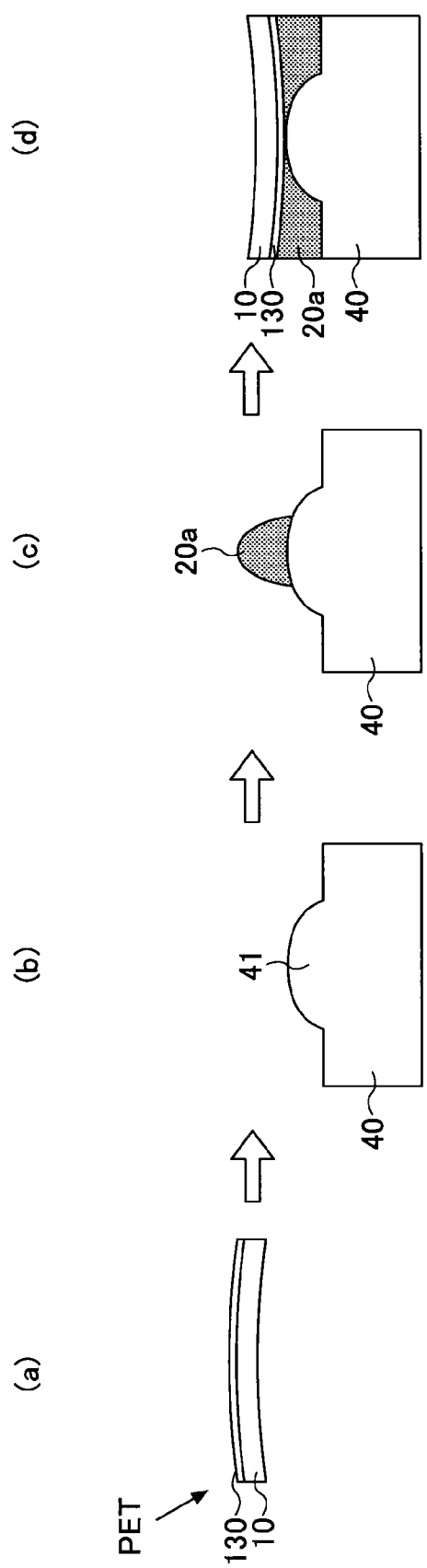
FIG. 17 is a view illustrating manufacturing steps (1) of a method of manufacturing the optical element of the third embodiment.

First, as illustrated in FIG. 17-(a), the transparent intermediate film 130 is formed at the one surface of the transparent substrate 10. The transparent intermediate film 130 is formed by depositing silicon oxide at the one surface of the transparent substrate 10 by sputtering or the like. As the transparent intermediate film 130 formed as such has compressive stress, the transparent substrate 10 is warped such that the surface at which the transparent intermediate film 130 is formed becomes a convex shape. Here, for the transparent substrate 10, from a point of view of making it thinner, for example, PET, polycarbonate, olefin-based resin, a glass or the like may be used. The thickness of the transparent substrate 10 may be about 30 µm to 200 µm, and preferably, about 50 µm from a point of view of processability or making it thinner.

Next, as illustrated in FIG. 17-(b), a mold 40 for forming the light absorbing portion 20 is prepared. The mold 40 is provided with a convex portion 41 whose height is 25 µm at a center portion. The convex portion 41 has a shape corresponding to the concave shape of the light absorbing portion 20 to be formed. Here, the entirety of the mold 40 may be made of a material such as nickel, stainless, copper, resin or the like; then NiP plating may be performed on the surface and may be processed to be in the convex shape.

Next, as illustrated in FIG. 17-(c), a light absorbing resin material 20a is dropped for forming the light absorbing portion 20. The light absorbing resin material 20a may be a photo-setting resin that is cured by irradiating ultraviolet light, a thermosetting resin or a thermoplastic resin that is cured by heat, or the like, and may include a black material that absorbs light such as titan black, carbon black or the like. An example is explained below in which photo-setting resin is used.

Next, as illustrated in FIG. 17-(d), the transparent substrate 10 is mounted on the dropped light absorbing resin material 20a such that the one surface at which the transparent intermediate film 130 is formed faces a side where the dropped light absorbing resin material 20a is formed.

Figure 18:
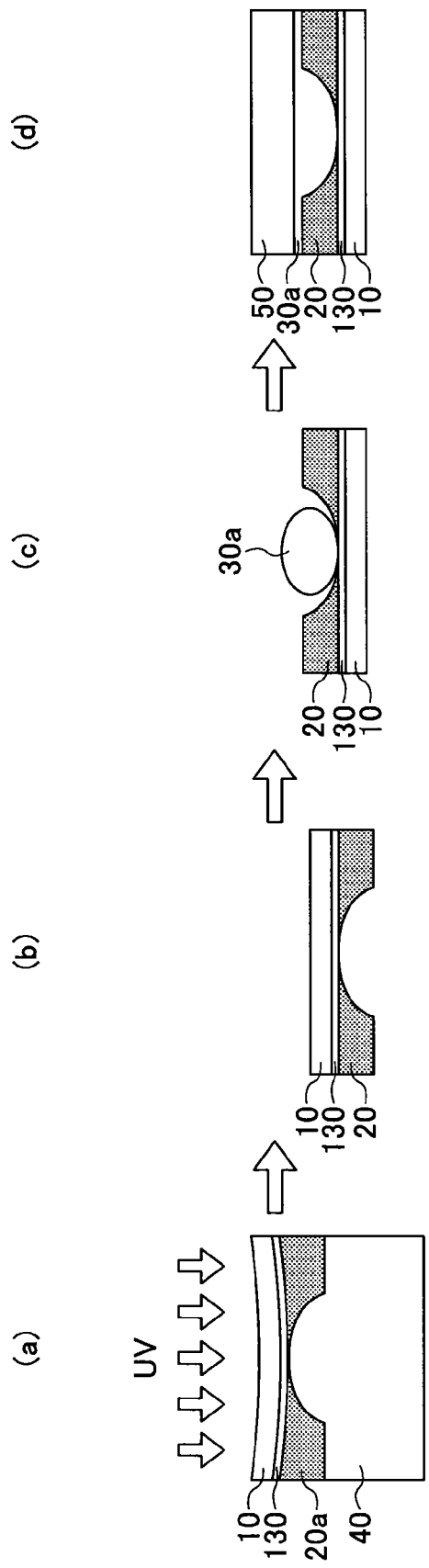
FIG. 18 is a view illustrating manufacturing steps (2) of a method of manufacturing the optical element of the third embodiment.

Next, as illustrated in FIG. 18-(a), ultraviolet light (UV) is irradiated from a side where the transparent substrate 10 is mounted to cure the light absorbing resin material 20a and to form the light absorbing portion 20. Here, ultraviolet light corresponding to a curing condition of the resin may be appropriately irradiated.

Next, as illustrated in FIG. 18-(b), the transparent substrate 10 and the light absorbing portion 20 are released from the mold 40. With this, the light absorbing portion 20 with a concave shape is formed on the transparent substrate 10. Here, the formed light absorbing portion 20 includes a material that absorbs light such as titan black, carbon black or the like. Although not illustrated in the drawings, there is a case in which the transparent substrate 10 is slightly warped such that a surface at the side where the light absorbing portion 20 is formed has a convex shape due to the transparent intermediate film 130 even when the light absorbing portion 20 is formed.

Next, as illustrated in FIG. 18-(c), a light transmitting resin material 30a is dropped at a portion with the concave shape of the light absorbing portion 20. For the light transmitting resin material 30a, photo-setting resin, thermo-setting resin, or thermoplastic resin that passes light may be used. In the following, an example is explained in which photo-setting resin that is cured by irradiating ultraviolet light is used.

Next, as illustrated in FIG. 18-(d), a release substrate 50 is mounted on the dropped light transmitting resin material 30a. The release substrate 50 is made of quartz, for example, and a mold release treatment is performed at its surface in order to easily release a product later. For a mold release treatment agent, an organic component or an inorganic component including fluorine or the like may be used and a surface treatment is performed.

Figure 19:
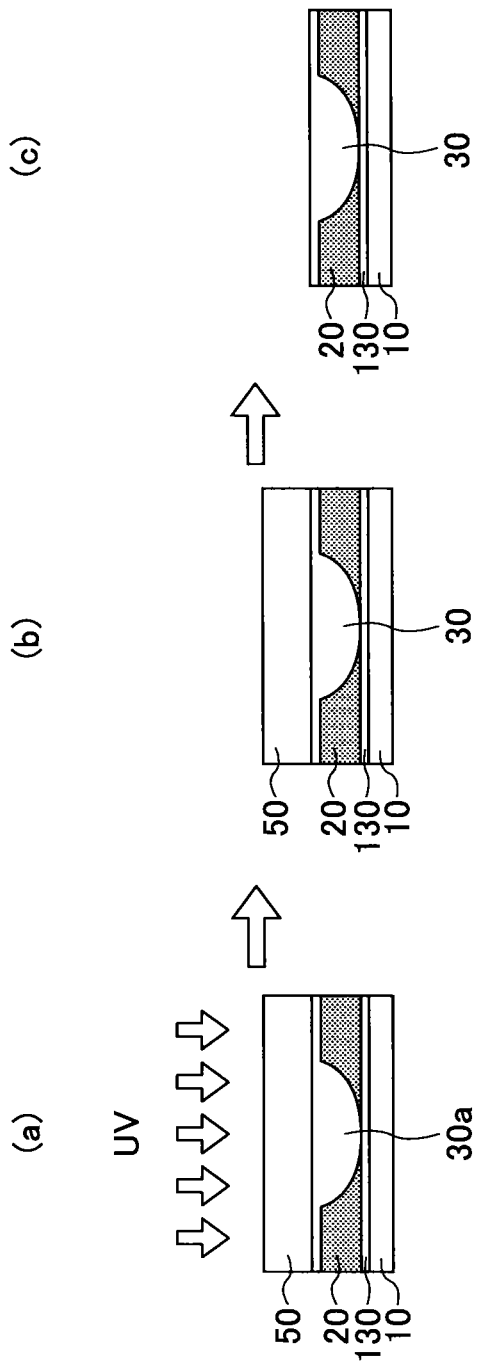
FIG. 19 is a view illustrating manufacturing steps (3) of a method of manufacturing the optical element of the third embodiment.

Next, as illustrated in FIG. 19-(a), ultraviolet light is irradiated through the release substrate 50. After irradiating the ultraviolet light, a heat treatment such as annealing or the like may be performed in accordance with necessity.

As such, as illustrated in FIG. 19-(b), by irradiating the ultraviolet light, the light transmitting resin material 30a is cured and the light transmitting portion 30 is formed.

Next, as illustrated in FIG. 19-(c), by releasing the release substrate 50, the optical element of the embodiment is manufactured. As the transparent intermediate film 130 formed at the one surface of the transparent substrate 10 as such has compressive stress, in the optical element, the tensile stress of the light absorbing portion 20 and the light transmitting portion 30 is canceled and the optical element without a warp or the optical element with a small warp can be formed.

Here, other than the above described are the same as those of the first embodiment.

Fourth Embodiment

Next, fourth embodiment is explained. The embodiment relates to an imaging apparatus using the optical element of each of the first to third embodiments. The imaging apparatus of the embodiment is mounted on an electronic device such as a smartphone, a mobile phone or the like that is portable and has a communication function.

Figure 20:
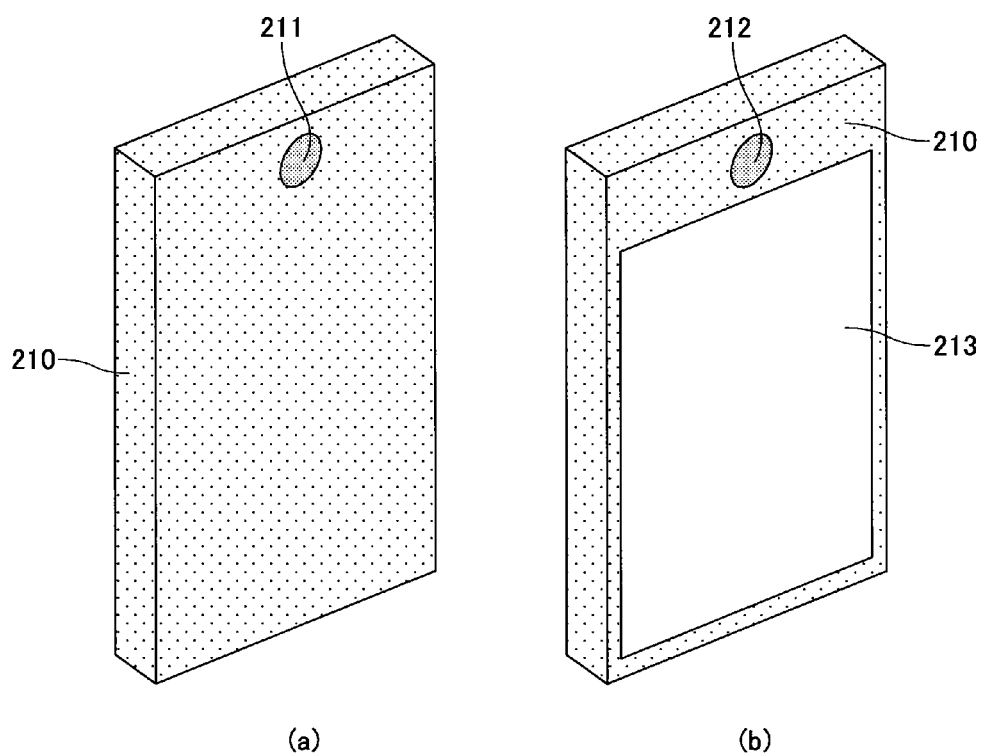
FIG. 20 is a view for explaining a smartphone on which an imaging apparatus of a fourth embodiment is mounted.

Specifically, as illustrated in FIG. 20, the imaging apparatus of the embodiment is mounted on a smartphone 210 as a main camera 211 or a sub-camera 212. In this embodiment, the main camera 211 is mounted on a surface that is opposite to a surface at which a display screen 213 is provided, and the sub-camera 212 is mounted on the surface at which the display screen 213 is provided, in the smartphone 210. Here, FIG. 20-(a) is a perspective view of the smartphone 210 at a back surface side, and FIG. 20-(b) is a perspective view of the smartphone 210 at a display screen 213 side.

Figure 21:
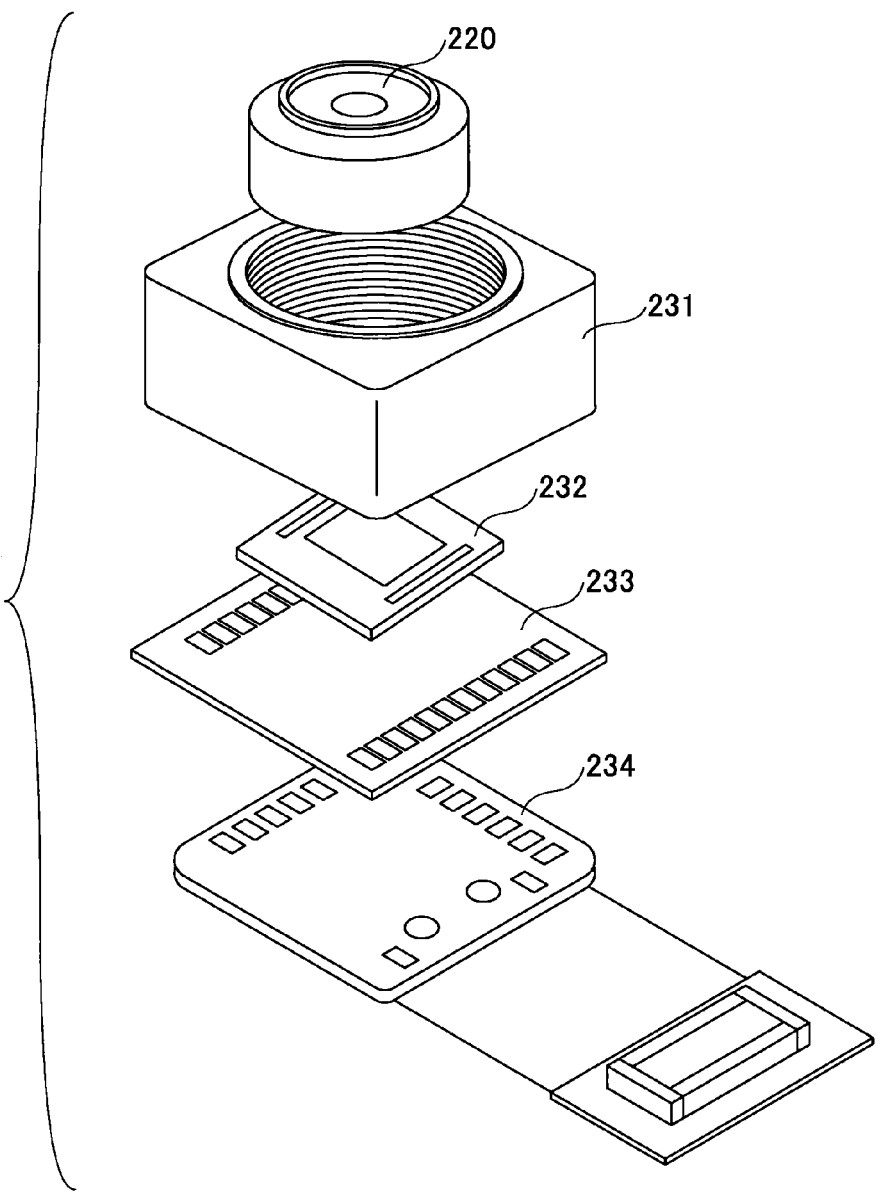
FIG. 21 is a view for explaining the imaging apparatus of the fourth embodiment.

As illustrated in FIG. 21, the main camera 211 or the sub-camera 212, which is the imaging apparatus of the embodiment, includes an optical system 220, an autofocus unit 231, an image sensor 232, which is an imaging element, a substrate 233, a flexible substrate 234 and the like. The optical system 220 is mounted on the autofocus unit 231, and the operation of the optical system 220 is controlled by the autofocus unit 231 to perform an autofocus operation. The image sensor 232, which is the imaging element, is constituted by a CMOS sensor or the like, and detects an image generated by light injected via the optical system 220 in the image sensor 232.

Figure 22:
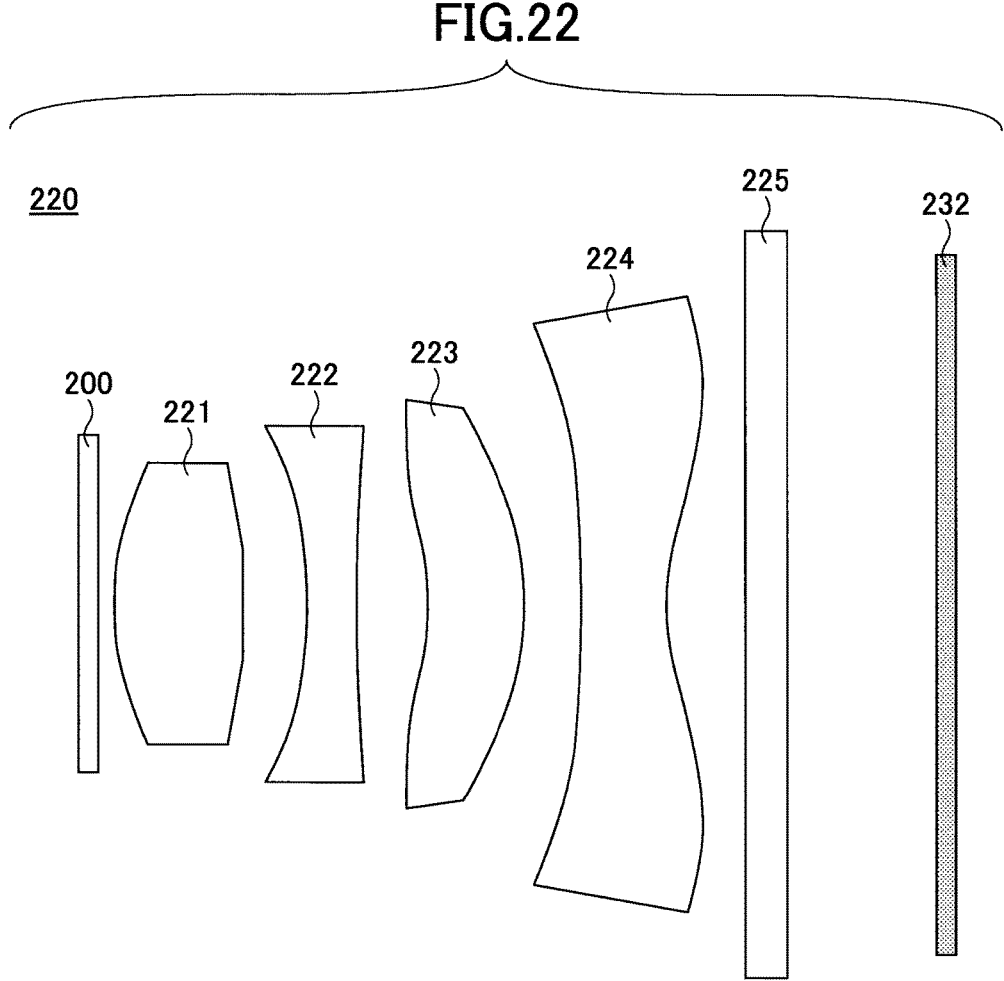
FIG. 22 is a view for explaining an optical system of the imaging apparatus of the fourth embodiment.

As illustrated in FIG. 22, the optical system 220 includes the optical element 200 of the first embodiment, second embodiment or third embodiment, a first lens 221, a second lens 222, a third lens 223, a fourth lens 224 and an infrared cut filter 225.

In the optical system 220, the light injected from the optical element 200 is further injected to the image sensor 232 through the first lens 221, the second lens 222, the third lens 223, the fourth lens 224 and the infrared cut filter 225.

According to the embodiment, an optical element, in which transmittance of light monotonically decreases from a center portion toward a peripheral portion, without a warp or with a small warp even when the optical element is made of a resin material can be provided.

Although a preferred embodiment of the optical element, the optical system and the imaging apparatus has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention.

What is claimed is:

1. An optical element, comprising:
   a transparent substrate comprising a transparent resin material;
   a light absorbing portion comprising a resin material which absorbs at least a part of visible light and formed on a first surface of the transparent substrate;
   a light transmitting portion comprising a resin material which transmits the visible light and formed on the light absorbing portion; and
   a transparent resin layer comprising a resin material which transmits the visible light and formed on a second surface of the transparent substrate,
   wherein the light absorbing portion has a first portion formed such that the light absorbing portion has a thickness which monotonically increases from a center portion toward a peripheral portion of the light absorbing portion, and a second portion formed in the peripheral portion such that the light absorbing portion has substantially a constant thickness.

2. The optical element according to claim 1, wherein the light absorbing portion, the light transmitting portion, and the transparent resin layer satisfy $0.02 \times t1 < t2 < 5 \times t1$, where t1 is a total thickness of the light absorbing portion and the light transmitting portion, and t2 is a thickness of the transparent resin layer.

3. The optical element according to claim 1, wherein the transparent resin layer includes at least one of a hard coat layer, an antireflection film and an antistatic film.

4. The optical element according to claim 1, wherein each of the light absorbing portion, the light transmitting portion and the transparent resin layer has tensile stress.

5. An optical system, comprising:
the optical element according to claim 1; and
a lens positioned to receive the visible light from the optical element.

6. An imaging apparatus, comprising:
the optical element according to claim 1;
a lens positioned to receive the visible light from the optical element; and
an imaging element positioned to receive the visible light from the lens.

7. A portable electronic device having a communication function, comprising:
the imaging apparatus according to claim 6.

8. The optical element according to claim 1, wherein the light absorbing portion comprises the black material comprising one of titan black and carbon black.

9. An optical element, comprising:
a transparent substrate comprising a transparent resin material;
a light absorbing portion comprising a resin material which absorbs at least a part of visible light and formed on a first surface of the transparent substrate;
a light transmitting portion comprising a resin material which transmits the visible light and formed on the light absorbing portion; and
a transparent film comprising an inorganic material which transmits the visible light and formed on the light transmitting portion,
wherein the light absorbing portion has a first portion formed such that the light absorbing portion has a thickness which monotonically increases from a center portion toward a peripheral portion of the light absorbing portion, and a second portion formed in the peripheral portion such that the light absorbing portion has substantially a constant thickness.

10. The optical element according to claim 9, wherein each of the light absorbing portion and the light transmitting portion has tensile stress, and the transparent film has compressive stress.

11. The optical element according to claim 9, wherein the transparent film is a single layered antireflection film or an antireflection film comprising materials which are alternately stacked and whose refractive indexes are different.

12. The optical element according to claim 9, wherein the transparent film is formed by vacuum deposition or sputtering.

13. An optical system, comprising:
the optical element according to claim 9; and
a lens positioned to receive the visible light from the optical element.

14. An imaging apparatus, comprising:
the optical element according to claim 9;
a lens positioned to receive the visible light from the optical element; and
an imaging element positioned to receive the visible light from the lens.

15. A portable electronic device having a communication function, comprising:
the imaging apparatus according to claim 14.

16. An optical element, comprising:
a transparent substrate comprising a transparent resin material;
a transparent intermediate film comprising an inorganic material which transmits visible light and formed on a first surface of a transparent substrate;
a light absorbing portion comprising a resin material which absorbs at least a part of the visible light and formed on the transparent intermediate film; and
a light transmitting portion comprising a resin material which transmits the visible light and formed on the light absorbing portion,
wherein the light absorbing portion has a first portion formed such that the light absorbing portion has a thickness which monotonically increases from a center portion toward a peripheral portion of the light absorbing portion, and a second portion formed in the peripheral portion such that the light absorbing portion has substantially a constant thickness.

17. The optical element according to claim 16, wherein each of the light absorbing portion and the light transmitting portion has tensile stress, and the transparent intermediate film has compressive stress.

18. The optical element according to claim 16, wherein the transparent intermediate film is formed by vacuum deposition or sputtering.

19. An optical system, comprising:
the optical element according to claim 16; and
a lens positioned to receive the visible light from the optical element.

20. An imaging apparatus, comprising:
the optical element according to claim 16;
a lens positioned to receive the visible light from the optical element; and
an imaging element positioned to receive the visible light from the lens.

21. A portable electronic device having a communication function, comprising:
the imaging apparatus according to claim 20.

* * * * *